US009807343B2

(12) United States Patent
Oh et al.

(10) Patent No.: US 9,807,343 B2
(45) Date of Patent: Oct. 31, 2017

(54) APPARATUS AND METHOD FOR CHANGING MODE OF DEVICE

(71) Applicant: Samsung Electronics Co., Ltd., Gyeonggi-do (KR)

(72) Inventors: Gyu-Bong Oh, Gyeonggi-do (KR); Kyung-Hun Jung, Seoul (KR); Jong-Hyun Jin, Gyeonggi-do (KR); Han-Il Yu, Gyeonggi-do (KR); Soon-Hyun Cha, Gyeonggi-do (KR); Jae-Seung Yun, Gyeonggi-do (KR)

(73) Assignee: Samsung Electronics Co., Ltd (KR)

(*) Notice: Subject to any disclaimer, the term of this patent is extended or adjusted under 35 U.S.C. 154(b) by 0 days.

(21) Appl. No.: 14/707,742

(22) Filed: May 8, 2015

(65) Prior Publication Data

US 2015/0326823 A1 Nov. 12, 2015

(30) Foreign Application Priority Data

May 8, 2014 (KR) ........................ 10-2014-0054716
Apr. 16, 2015 (KR) ........................ 10-2015-0053794

(51) Int. Cl.
*H04W 92/02* (2009.01)
*H04N 7/15* (2006.01)
(Continued)

(52) U.S. Cl.
CPC ......... *H04N 7/152* (2013.01); *H04L 65/1059* (2013.01); *H04L 65/1089* (2013.01);
(Continued)

(58) Field of Classification Search
USPC .................. 455/41.2; 709/208–211; 370/350
See application file for complete search history.

(56) References Cited

U.S. PATENT DOCUMENTS 5,313,462 A * 5/1994 Fujino .................. H04J 3/0605 358/409
7,554,571 B1 6/2009 Beck et al.
(Continued)

OTHER PUBLICATIONS

International Search Report dated Aug. 13, 2015 issued in counterpart application No. PCT/KR2015/004637, 9 pages.

*Primary Examiner* — Maria El-Zoobi
(74) *Attorney, Agent, or Firm* — The Farrell Law Firm, P.C.

(57) ABSTRACT

Methods and apparatuses are provided for changing a mode of a device by a server. The server receives, from a master device, at least one of a user preference document including information related to whether mode synchronization is activated between devices, a device context profile (DCP) document including a rule applied per mode, and a DCP directory document including information related to a profile activated in the DCP document. The at least one of the user preference document, the DCP document, and the DCP directory document is registered. When information related to changing a mode of the master device is received, the at least one of the user preference document, the DCP document, and the DCP directory document is changed based on the changed mode of the master device. The at least one of the changed user preference document, the changed DCP document, and the changed DCP directory document is transmitted to at least one slave device.

20 Claims, 21 Drawing Sheets

(51) Int. Cl.
*H04N 7/14* (2006.01)
*H04L 29/06* (2006.01)
*H04L 29/08* (2006.01)
*H04N 5/45* (2011.01)
*H04W 4/00* (2009.01)

(52) U.S. Cl.
CPC ............... *H04L 67/30* (2013.01); *H04N 5/45* (2013.01); *H04N 7/147* (2013.01); *H04N 7/15* (2013.01); *H04N 2007/145* (2013.01); *H04W 4/001* (2013.01)

(56) References Cited

U.S. PATENT DOCUMENTS

2002/0026492 A1* 2/2002 Fujita .................... H04L 69/323 709/208
2003/0158886 A1* 8/2003 Walls ........................ G06F 3/14 709/201
2005/0065619 A1* 3/2005 Kim ....................... G08C 19/28 700/3
2005/0181725 A1* 8/2005 Dabak ................... H04W 92/02 455/41.2
2008/0225109 A1 9/2008 Lee
2012/0044836 A1* 2/2012 Sivavakeesar ........ H04W 24/02 370/255
2012/0320142 A1 12/2012 Baird
2013/0188517 A1* 7/2013 Kosaka ............... H04L 43/0835 370/254
2013/0271651 A1 10/2013 Sullivan
2013/0322462 A1* 12/2013 Poulsen .................... H04J 3/06 370/458
2014/0012587 A1 1/2014 Park
2014/0307727 A1* 10/2014 Cha ....................... H04W 56/00 370/350

* cited by examiner

```
<User-Pref id=abc123>
<mode-sync state="on">
<wifi-sync> true </wifi-sync>
<airplane-sync> true </airplane-sync>
<sleep-sync> true </sleep-sync>
<manner-sync> true </manner-sync>
<roaming-sync> true </roaming-sync>
</mode-sync>
</User-Pref>
```

```
LTE Profile
  <rule id="f3q44r1">
     <conditions>
          - LTE connection
     </conditions>
     <actions>
          - Deliver Notifications from Subscribed Ser
vices (Blocked if Roaming case)
          - Deliver Message Notifications
          - Block 3rd party Service Notifications
            many such actions can be included
     </actions>
   </rule>
```

FIG.17B

```
WiFi Profile
  <rule id="ythk764">
     <conditions>
          - WiFi connection
     </conditions>
     <actions>
          - [illegible] Notifications from Subscribed Ser
vices
          - Deliver Message Notifications
          - Deliver 3rd party Service Notifications
            many such actions can be included
     </actions>
   </rule>
```

```
Airplane Mode Profile
  <rule id="1lt2t45">
     <conditions>
          - Airplane
     </conditions>
     <actions>
          - Block Notifications from Subscribed
Services
          - Block Message Notifications
          - Block 3rd party Service Notifications
          - Deactivate the data connection
            many such actions can be included
     </actions>
   </rule>
```

FIG.17C

```
Sleep Mode Profile
  <rule id="ugeg456">
     <conditions>
          - Sleep
     </conditions>
     <actions>
          - Block Notifications from Subscribed
Services
            Deliver Message Notifications
          - Block 3rd party Service Notifications
          - Activate the maximum power saving mode
for mobile, tablet
          - Activate the sleep mode for air-
conditioner and lights
          - many such actions can be included
     </actions>
   </rule>
```

FIG.17D

Content of Device Context Profile (DCP) Directory Document of a user :

Create profiles named "LTE", "WiFi", "Roaming", "Airplane" and "Sleep" etc.

- Application Server selects "LTE" profile as Active device DCP from his master device whose id is sip:ronald.underwood@example.com;gr= qazyhnujmgh78a.
- Application Server selects "WiFi" profile (ref-id="abc9i") as Active slave device DCP (id="1qaz") if master device's network connection becomes WiFi connection and does profile change to WiFi.
- Application Server selects "LTE" profile (ref-id="xyz8dh") as Active slave device DCP (id="1qaz") if master device's network connection becomes LTE connection and does profile change to LTE.
- Application Server selects "Roaming" profile (ref-id="def7j") as Active slave device DCP (id="1qaz") if master device's network connection becomes Roaming connection and does profile change to Roaming.
- Application Server selects "Airplane" profile (ref-id="ghi6k") as Active slave device DCP (id="3edc") and apply it to the dedicated device group (dp-id="aaa111") if master device's mode becomes Airplane mode and does profile change to Airplane.
- Application Server selects "Sleep" profile (ref-id="jkl5l") as Active slave device DCP (id="5tgb") and apply it to the dedicated device group (dp-id="bbb222") if master device's mode becomes Sleep mode and does profile change to Sleep.

FIG.18

```
<?xml version="1.0" encoding="UTF-8"?>
<dcp-directory xmlns="urn:xml:xdm:dcp-directory">
  <!-set of Device Context Profiles available created-->
  <!-set of per-mode device context profiles-->

    <dcp-set>
      <dcp dcp-id="xyz8dh">
            <display-name> LTE </display-name>
      </dcp>
      <dcp dcp-id="abc9i">
            <display-name> Wifi </display-name>
      </dcp>
      <dcp dcp-id="def7j">
            <display-name> Roaming </display-name>
      </dcp>
      <dcp dcp-id="ghi6k">
            <display-name> Airplane </display-name>
      </dcp>
      <dcp dcp-id="jkl5l">
            <display-name> Sleep </display-name>
      </dcp>
      </dcp-set>

    <!-set of Devices for Device Profiles available created-->
    <!-set of terminal lists (wearable terminal list, home appliance list, master terminal list)-->
```

FIG.19A

```
<dp-set>
 <dp dp-id="aaa111">
        <display-name> wearable devices </display-name>
        <device-list>
        <device device-type="wearable" device-
id="sip:ronald.underwood@example.com;gr=kdfdhjkurgh97d"/>
        <device device-type="wearable" device-
id="sip:ronald.underwood@example.com;gr=yhndhjkurgh98d"/>
        <device device-type="wearable" device-
id="sip:ronald.underwood@example.com;gr=ujmdhjkurgh99d"/>
        </device-list>
</dp>
<dp dp-id="bbb222">
        <display-name> home appliances </display-name>
        <device-list>
        <device device-type="homeappliance" device-
id="sip:ronald.underwood@example.com;gr=qazdhjkurgh12q"/>
        <device device-type="homeappliance" device-
id="sip:ronald.underwood@example.com;gr=yhnwsxkurgh34r"/>
        <device device-type="homeappliance" device-
id="sip:ronald.underwood@example.com;gr=rfvdhjkurgh45t"/>
        </device-list>
</dp>
<dp dp-id="ccc333">
        <display-name> master device </display-name>
        <device-list>
        <device device-type="mobile" device-
id="sip:ronald.underwood@example.com;gr=qazyhnujmgh78a"/>
        <device device-type="tablet" device-
id="sip:ronald.underwood@example.com;gr=yhnujmikngh56d"/>
        </device-list>
</dp>
<dp-set>

<!-set of Active Device Context Profiles available created-->
<!-set of device-activated device context profiles-->
<active-dcp>
<!-Master Device's Device Context Profiles available created-->
<!-device context profile activated in master device-->
  <master-dcp>
      <master-device-id="sip:ronald.underwood@example.com;gr=qazyhnujmgh78a"/>
      <active-device-dcp dcp-reference ref-id="xyz8dh"> <!? LTE Profile -->
 </master-dcp>
```

FIG. 19B

```
    <!-set of Devices' active Device Context Profiles rule available created-->
    <!-set of device context profile rules according mode change in master terminal (e.g., if master terminal
      changes to roaming, profile of dependent (slave) terminal is changed/operated in roaming profile) -->
    <ruleset>
<rule id="f3g66r1">
    <conditions>
        - master device Connection becomes WiFi connection
    </conditions>
    <actions>
        - Activate WiFi Profile(ref-id="abc9i") on behalf of the existing Profile of slave
        devices dcp (id="1qaz")
    </actions>
</rule>
     <rule id="g6j88h1">
       <conditions>
        - master device Connection becomes LTE connection
  </conditions>
  <actions>
        - Activate LTE Profile(ref-id="xyz8dh") on behalf of the existing Profile of slave
         devices dcp (id="1qaz")
    </actions>
</rule>
    <rule id="r4y88s3">
      <conditions>
         - master device's Connection becomes Roaming connection
      </conditions>
      <actions>
        - Activate Roaming Profile(ref-id="def7j") on behalf of the existing Profile of slave
         devices dcp (id="1qaz")
      </actions>
</rule>
    <rule id="g3g22g1">
      <conditions>
          - master device becomes Airplane Mode
  </conditions>
  <actions>
     - Activate Airplane Mode (ref-id="ghi6k") on the dedicated slave device group (dp-id="aaa111")
  </actions>
</rule>
    <rule id="a3g22d1">
    <conditions>
          - master device becomes Sleep Mode
  </conditions>
  <actions>
     - Activate Sleep Mode (ref-id="jkl5l") on the dedicated slave device group (dp-id="bbb222")
  </actions> </rule>
</ruleset>
```

FIG.19C

```
<!-set of Slave Devices' active Device Context Profiles available created-->
<!-set of device context profiles activated in dependent device (e.g., in case master terminal turns
   into airplane mode (ghi6k),airplane mode applies to wearable terminal (aaa111) as well) -->
 <slave-device-dcp-set>
<slave-device-dcp id="1qaz">
        <dcp-reference ref-id="xyz8dh"/> <!- LTE Profile -->
        <device-id="sip:ronald.underwood@example.com;gr=kdfdhjkurgh97d"/>
        <device-id="sip:ronald.underwood@example.com;gr=qazdhjkurgh12q"/>
        <device-id="sip:ronald.underwood@example.com;gr=yhnujmikngh56d"/>
</slave-device-dcp>
<slave-device-dcp id="3edc">
        <dcp-reference ref-id="ghi6k"/> <!- Airplane Profile -->
        <dp-reference dp-id="aaa111"/>
</slave-device-dcp>
<slave-device-dcp id="5tgb">
        <dcp-reference ref-id="jkl5l"/> <!- Sleep Profile -->
        <dp-reference dp-id="bbb222"/>
</slave-device-dcp>
</slave-device-dcp-set>

        <!-set of Active Device Context Profiles available created-->
   <!-set of terminals applied with separate device context profile among terminals-->

   <active-device-dcp-set>
<active-device-dcp id="2wsx">
        <dcp-reference ref-id="abc9i"/> <!- WiFi Profile -->
        <device-id="sip:ronald.underwood@example.com;gr=yhndhjkurgh98d"/>
        <device-id="sip:ronald.underwood@example.com;gr=yhnwsxkurgh34r"/>
</active-device-dcp>
<active-device-dcp id="4rfv">
        <dcp-reference ref-id="ghi6k"/> <!- Airplane Profile -->
        <device-id="sip:ronald.underwood@example.com;gr=yhnujmikngh56d"/>
</active-device-dcp>
<active-device-dcp id="9olk">
        <dcp-reference ref-id="jkl5l"/> <!- Sleep Profile -->
        <device-id="sip:ronald.underwood@example.com;gr=rfvdhjkurgh45t"/>
</active-device-dcp-set>
</active-dcp>
</dcp-directory>
```

FIG.19D

APPARATUS AND METHOD FOR CHANGING MODE OF DEVICE

PRIORITY

This application claims priority under 35 U.S.C. §119(a) to a Korean patent application filed in the Korean Intellectual Property Office on May 8, 2014 and assigned Serial No. 10-2014-0054716, and a Korean patent application filed in the Korean Intellectual Property Office on Apr. 16, 2015 and assigned Serial No. 10-2015-0053794, the contents of which are incorporated herein by reference.

BACKGROUND OF THE INVENTION

1. Field of the Invention

The present disclosure relates generally to video call systems, and more particularly, to apparatuses and methods for controlling multi-view images in video call systems, and for collectively changing modes of devices carried by a user.

2. Description of the Related Art

The development of data transmission technology between portable terminals has enabled video calling through which a portable terminal user may make a face-to-face call with another party. Video calling may apply to video conference systems to allow easy conferencing among users in remote sites. Video calling may also be integrated with a number of techniques, such as, for example, the "dual video call" technique in which the user's face and captured objects can be shown to the other party on the same screen, thereby offering the user more diversified and convenient video call services.

A video call basically involves one or more pictures-in-picture (PIPs) in addition to the image transmitted in real-time from the terminal or server. However, a method does not exist for moving the PIP on the screen or turning on/off an individual PIP on the phone.

The Internet is evolving from the human-centered connection network by which humans create and consume information to the Internet of things (IoT) network by which information is communicated and processed between things or other distributed components. The Internet of everything (IoE) technology is an example of a combination of big data processing technology and IoT technology through, for example, a connection with a cloud server.

To implement the IoT, technology elements, such as, for example, a sensing technology, wired/wireless communication and network infra, service interface technology, and a security technology, are required. Inter-object connection technologies include, for example, the sensor network, machine-to-machine (M2M), or machine-type communication (MTC).

The IoT environment may offer intelligent Internet technology (IT) services that collect and analyze the data generated by the things connected with one another. The IoT may have various applications, such as, for example, the smart home, smart building, smart city, smart car or connected car, smart grid, health-care, or smart appliance industry, or state-of-art medical services, through conversion or integration of existing IT technologies and various industries.

The user may own various devices including an IoT device, a wearable device, or an electric-health (e-health) device, and may be served with various convenient services through such devices.

However, when the user carrying a plurality of devices moves from a network that is currently providing a service to another network, for example upon moving from a long term evolution (LTE) network to a wireless fidelity (Wi-Fi) network, the user is required to individually change network modes on each of the devices.

Since the user is required individually change network modes for each device, it is nearly impossible to adjust the LTE data usage per device.

Further, the user is required to make these individual mode changes for each of the devices even when the devices are changed into an airplane mode, a sleep mode, or a roaming mode.

SUMMARY OF THE INVENTION

The present invention has been made to address at least the above problems and/or disadvantages and to provide at least the advantages described below. Accordingly, an aspect of the present invention provides a method and an apparatus for controlling a multi-view image in a video call system.

Another aspect of the present invention provides a method and an apparatus for controlling a PIP included in a multi-view image in a video call system.

Another aspect of the present invention provides a method and an apparatus for moving, on the screen, a PIP included in a multi-view image in a video call system.

Another aspect of the present invention provides a method and an apparatus for individually turning on/off a PIP included in a multi-view image in a video call system.

Another aspect of the present invention provides a method and an apparatus for adjusting the size of a PIP included in a multi-view image in a video call system.

Another aspect of the present invention provides a method and an apparatus for changing modes of devices.

Another aspect of the present invention provides a method and an apparatus for collectively changing modes of at least two slave devices.

According to an embodiment of the present invention, a terminal is provided for controlling a multi-view image in an image communication system. The terminal includes a receiving unit configured to receive, from an opposing terminal, a first message comprising information related to a number of cameras in the opposing terminal and information related to a number of images that may be displayed by the opposing terminal among images provided by the terminal, and to receive, from the opposing terminal a second message comprising a camera identifier field indicating a unique number of a camera of the cameras in the opposing terminal and a request field requesting to control an image taken by the camera indicated by the camera identifier field. The terminal also includes a controller configured to control the image taken by the camera indicated by the camera identifier field based on values of the camera identifier field and the request field.

According to another embodiment of the present invention, a terminal is provided for controlling a multi-view image in an image communication system. The terminal includes a transmitting unit configured to transmit a first message and a second message, the first message comprising information related to a number of cameras in the terminal and information related to a number of images that may be displayed by the terminal among images provided by an opposing terminal, the second message comprising a camera identifier field and a request field. The terminal also includes a controller configured to set the camera identifier field to indicate a unique number of a camera of the cameras in the terminal and to set the request field to request to control an image taken by the camera indicated by the camera identifier field, based on a predetermined event, when the predetermined event occurs.

According to another embodiment of the present invention, a method is provided for changing a mode of a device by a server. The server receives, from a master device, at least one of a user preference document including information related to whether mode synchronization is activated between devices, a device context profile (DCP) document including a rule applied per mode, and a DCP directory document including information related to a profile activated in the DCP document. The at least one of the user preference document, the DCP document, and the DCP directory document is registered. When information related to changing a mode of the master device is received, the at least one of the user preference document, the DCP document, and the DCP directory document is changed based on the changed mode of the master device. The at least one of the changed user preference document, the changed DCP document, and the changed DCP directory document is transmitted to at least one slave device.

According to another embodiment of the present invention, a method for changing a mode of a slave device by a master device. A server generates at least one of a user preference document including information related to whether mode synchronization is activated between devices, a DCP document including a rule applied per mode, and a DCP directory document including information related to a profile activated in the DCP document. The at least one of the user preference document, the DCP document, and the DCP directory document is registered in the server. When a mode of the master device is changed, the at least one of the user preference document, the DCP document, and the DCP directory document, which is changed based on the changed mode of the master device, is transmitted to at least one slave device through the server.

According to another embodiment of the present invention, a server is provided for changing a mode of a device. The server includes a receiving unit configured to receive, from a master device, and at least one of a user preference document including information related to whether mode synchronization is activated between devices, a DCP document including a rule applied per mode, and a DCP directory document including information related to a profile activated in the DCP document. The server also includes a storage configured to register the at least one of the user preference document, the DCP document, and the DCP directory document. The server additionally includes a controller configured to, when information related to changing a mode of the master device is received, change the at least one of the registered user preference document, the DCP document, and the DCP directory document based on the changed mode of the master device. The server further includes a transmitting unit configured to transmit the at least one of the changed user preference document, the changed DCP document, and the changed DCP directory document to at least one slave device.

According to another embodiment of the present invention, a master device is provided for changing a mode of a slave device. The master device includes a controller configured to generate and register, in a server, at least one of a user preference document including information related to whether mode synchronization is activated between devices, a DCP document including a rule applied per mode, and a DCP directory document including information related to a profile activated in the DCP document. The master device also includes a transmitting unit configured to, when a mode of the master device is changed, transmit the at least one of the user preference document, the DCP document, and the DCP directory document, which is changed based on the changed mode of the master device to at least one slave device through the server.

According to another embodiment of the present invention, a method is provided for changing a mode by a slave device. A DCP information subscribe request is transmitted to a server requesting at least one of a user preference document including information related to whether mode synchronization is activated between devices, a DCP document including a rule applied per mode, and a DCP directory document including information related to a profile activated in the DCP document. The at least one of the user preference document, the DCP document, and the DCP directory document is received from the server. Upon receiving, from the server, at least one of a changed user preference document, a changed DCP document, and a changed DCP directory document, changed based on a mode change in a master device, a mode of the slave device is changed based on the at least one of the changed user preference document, the changed DCP document, and the changed DCP document.

According to another embodiment of the present invention, a slave device is provided for changing a mode based on a master device. The slave device includes a transmitting unit configured to transmit, to a server, a DCP information subscribe request requesting at least one of a user preference document including information related to whether mode synchronization is activated between devices, a DCP document including a rule applied per mode, and a DCP directory document including information related to a profile activated in the DCP document. The slave device also includes a receiving unit configured to receive, from the server, the at least one of the user preference document, the DCP document, and the DCP directory document. The slave device further includes a controller configured to, upon receiving, from the server, at least one of a changed user preference document, a changed DCP document, and a changed DCP directory document, changed based on a mode change in a master device, changing a mode of the slave device based on the at least one of the changed user preference document, the changed DCP document, and the changed DCP directory document.

BRIEF DESCRIPTION OF THE DRAWINGS

The above and other aspects, features, and advantages of the present invention will be more apparent from the following detailed description when taken in conjunction with the accompanying drawings, in which:

FIG. 16 is a diagram illustrating a user preference document constituting an extensible markup language (XML) document for configuring a terminal context;

FIGS. 17A-17D is a diagram illustrating a DCP document constituting an XML document for configuring a terminal context;

FIG. 18 is a diagram illustrating an example of a DCP directory constituting an XML document for configuring a terminal context of a device group;

FIGS. 19A-19D are diagrams illustrating a DCP directory document constituting an XML document for configuring a terminal context of a device group;

DETAILED DESCRIPTION OF EMBODIMENTS OF THE PRESENT INVENTION

Figure 1:
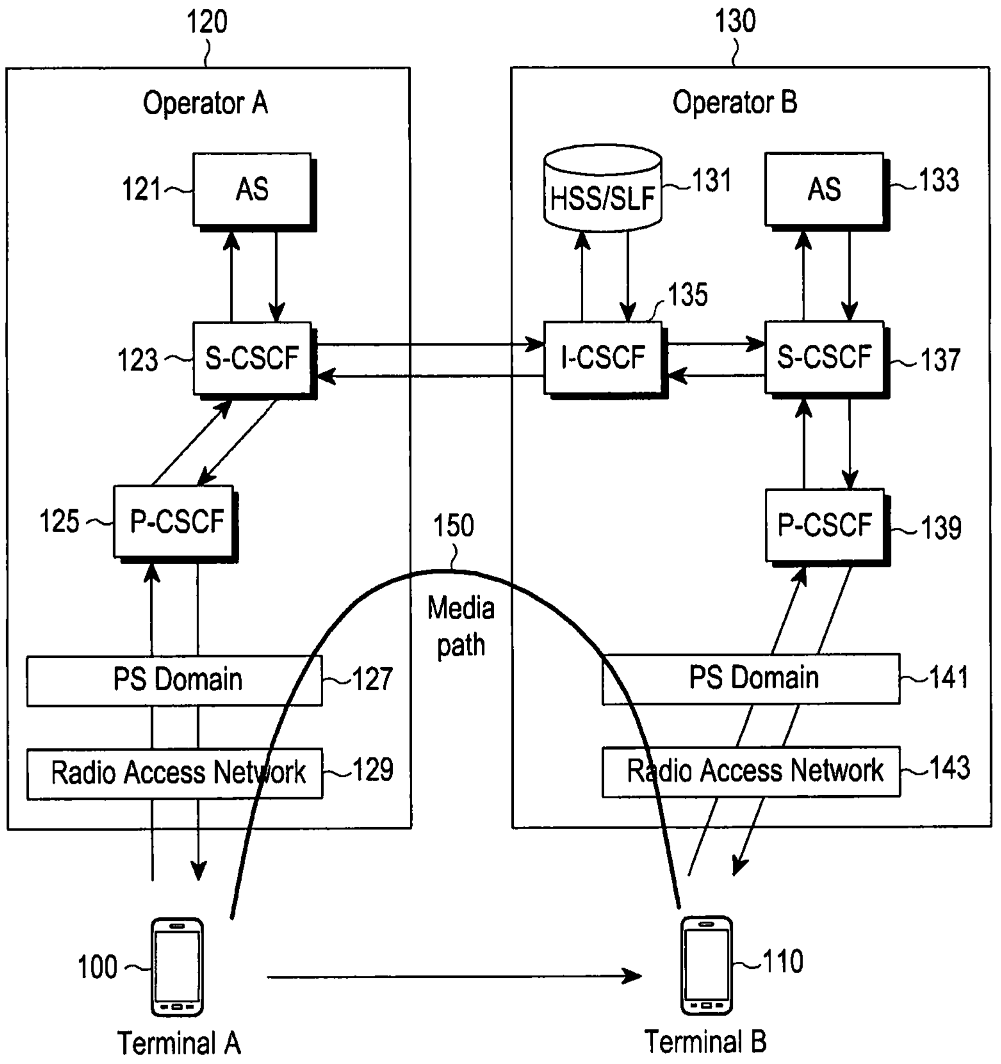
FIG. 1 is a diagram illustrating Internet protocol multimedia subsystem sessions negotiated between terminals in a video call system.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

FIG. 1 is a diagram illustrating Internet protocol multimedia subsystem sessions negotiated between terminals in a video call system.

In connection with FIG. 1, IMS sessions are negotiated between a transmitting terminal, i.e., terminal A 100, connected to operator A's Internet protocol multimedia subsystem (IMS) 120, and a receiving terminal, i.e., terminal B 110, connected to operator B's IMS 130.

Terminal A 100 transmits a session description protocol (SDP) offer message for IMS session negotiation to terminal B 110 through operator A's IMS 120. Terminal B 110 receives the SDP offer message through operator B's IMS 130 and transmits an SDP response message to terminal A 100. Terminal A 100 receives the SDP response message through operator A's IMS 120.

Operator A's IMS 120 includes an application server (AS) 121 for managing additional services, a proxy-call session control function (P-CSCF) 125 for exchanging session initiation protocol (SIP)/SDP messages with each terminal, and a serving-CSCF (S-CSCF) 123 for managing all operations related to the IMS. Operator B's IMS 130 includes a home subscriber server (HSS)/subscription locator function (SLF) 131 for managing subscribers' information, an AS 133 for managing additional services, an interrogating-CSCF (I-CSCF) 135 for managing moves of SDP/SIP messages, an S-CSCF 137 for managing all operations related to the IMS, and a P-CSCF 139 for exchanging SIP/SDP messages.

Terminal A 100 and terminal B 110 establish a media path using the entities included in the respective IMSs 120 and 130, and exchange the SDP offer message and SDP response message through an established media path 150. Specifically, terminal A 100 transfers the SDP offer message to the P-CSCF 125 through a packet switched (PS) domain 127 and a random access network (RAN) 129, and the P-CSCF 125 delivers the SDP offer message to the S-CSCF 123. The S-CSCF 123 transfers the SDP offer message to the AS 121 and the I-CSCF 135 included in operator B's IMS 130. The I-CSCF 135 transfers the SDP offer message to the HSS/SLF 131 and the S-CSCF 137, and the S-CSCF 137 transfers the SDP offer message to the AS 133 and the P-CSCF 139. Terminal B 110 receives the SDP offer message transferred from the P-CSCF 139 through a PS domain 141 and a RAN 143.

Terminal B 110 having received the SDP offer message then transfers an SDP response message corresponding to the SDP offer message to the P-CSCF 139 through the PS domain 141 and the RAN 143, and the P-CSCF 139 transfers the SDP response message to the S-CSCF 137. The S-CSCF 137 transfers the SDP response message to the AS 133 and the I-CSCF 135, and the I-CSCF 135 transfers the SDP response message to the HSS/SLF 131 and the S-CSCF 123 included in operator A's IMS 120. The S-CSCF 123 transfers the SDP response message to the AS 121 and the P-CSCF 125, and terminal A receives the SDP response message transferred from the P-CSCF 125 through the PS domain 127 and the RAN 129.

An example of the SDP offer message transmitted from terminal A 100 to terminal B 110 for IMS session negotiation is shown in Table 1 below. In Table 1, an example of an SDP offer message transmitted for a multi-view video call is shown, and the term "multi-view" means configuring and displaying two or more images respectively taken by cameras on the same screen.

TABLE 1

| SDP offer |
| --- |
| m=video 49154 RTP/AVPF 99 |
| b=AS:512 |
| b=RS:0 |
| b=RR:2500 |
| a=rtpmap:99 H264/90000 |
| a=fmtp:99 packetization-mode=0; profile-level-id=42e00c |
| a=imageattr:99 send [x=320,y=240] [x=640,y=480] recv[x=320,y=240] [x=640,y=480] |
| a=MVC:99 send 3 recv |

In Table 1, the SDP offer message indicates that terminal A 100 supports the H.264 video codec and proposes to transmit packets including related images and real-time transmission protocol (RTP)/UDP/IP headers at a bit rate of 512 kbps and to transmit a real-time transmission control protocol (RTCP) receiver report (RR) at 2500 bps. Further, the SDP offer message proposes to use one resolution of 640×480 and 320×240. In particular, the last line of the SDP offer message indicates that terminal A 100 has three cameras and is able to provide three images respectively taken by the cameras to terminal B 110.

An example of an SDP response message transmitted from terminal B 110 to terminal A 100 in response to the SDP offer message is as shown in Table 2 below.

TABLE 2

| SDP answer |
| --- |
| m=video 49154 RTP/AVPF 99 |
| b=AS:512 |
| b=RS:0 |
| b=RR.2500 |
| a=rtpmap:99 H264/90000 |
| a=fmtp:99 packetization-mode=0; profile-level-id=42e00c |
| a=imageattr:99 send [x=640,y=480] recv [x=640,y=480] |
| a=MVC:99 send 2 recv 3 |

In Table 2, the SDP response message indicates that terminal B 110 selects the bit rate, 512 kbps, proposed by terminal A 100 and selects 640×480 of the resolutions proposed by terminal A 100. Further, the last line of the SDP response message indicates that terminal B 110 may provide two images to terminal A 100 using two cameras and may display three images provided from terminal A 100. The SDP response message of Table 2 is provided as an example, and depending on the selection of terminal B 110, the SDP response message may indicate that a bit rate smaller than the bit rate, 512 kbps, proposed by terminal A 100 is selected and 320×240 of the resolutions proposed by terminal A 100 is selected. Further, the last line of the SDP response message may be set to "recv 2" to indicate that only two of the three images provided from terminal A 100 may be displayed, or the last line of the SDP response message may be set to "recv 1" to indicate that only one of the three images provided from terminal A 100 may be displayed.

As such, terminal A 100 and terminal B 110 exchange the SDP offer message and the SDP response message between each other and negotiate the number of images each may display and the number of images each may provide to its opposing terminal.

Figure 2:
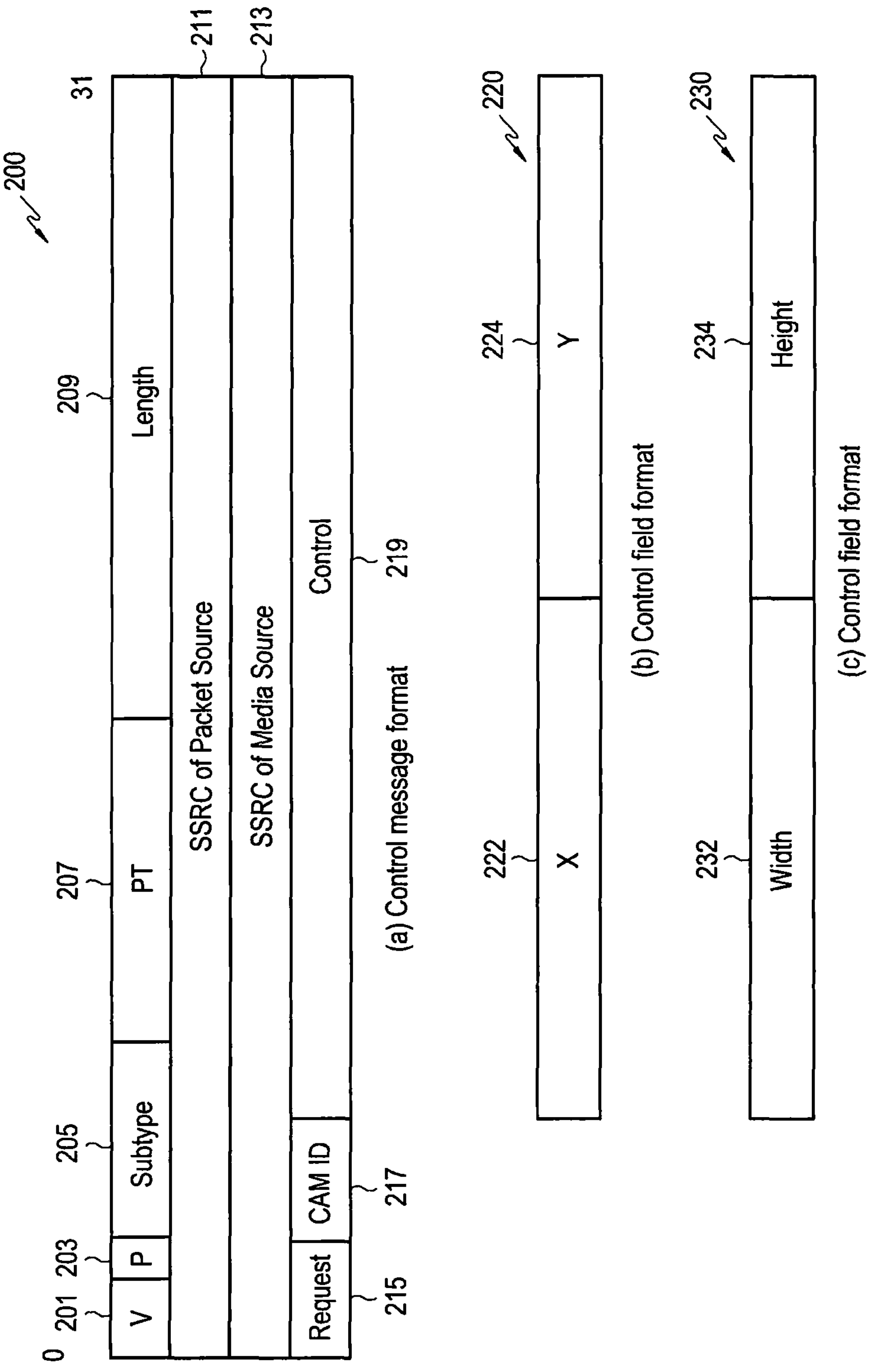
FIG. 2 is a diagram illustrating a format of a control message transmitted for controlling a multi-view video call in a video call system.

FIG. 2 is a diagram illustrating a format of a control message transmitted for controlling a multi-view video call in a video call system.

Referring to FIG. 2, a multiview video call (MVC) control message 200 is transmitted in an RTCP packet. The MVC control message 200 includes a two-bit version (V) field 201, a one-bit padding bit (P) field 203, a five-bit subtype field 205, a one-byte packet type (PT) field 207, a two-byte length 209, a four-byte synchronization source (SSRC) of packet source field 211, a four-byte SSRC of media source field 213, a three-bit request field 215, a three-bit camera identifier (CAM ID) field 217, and a 26-bit control field 219.

The V field 210 indicates the version of the RTP, the P field 203 indicates the padding bit, the subtype field indicates the type of MVC control message 200, the PT field 207 indicates the type of the MVC control message 200, the length field 209 indicates the length of the MVC control message 200, the SSRC of packet source field 211 indicates which sends the packet source, and the SSRC of media source field 213 indicates which receives a media source.

The request field 215 transmits a command for controlling a PIP included in the multi-view image displayed on a terminal in the MVC to an opposing terminal. The request field 215 may transmit various requests, depending on its set values, as shown Table 3 below.

TABLE 3

| Request field values | Description |
| --- | --- |
| 000 | Request to turn off image taken by camera indicated by CAM ID field |
| 001 | Request to turn on image taken by camera indicated by CAM ID field |
| 010 | Request to move image taken by camera indicated by CAM ID field |
| 011 | Request to change the size of image taken by camera indicated by CAM ID field |
| 100 | Request to set image taken by camera indicated by CAM ID field as background screen |
| 101-110 | Reserved |
| 111 | Indicate that the request by opposing terminal for image taken by camera has been performed |

The terminal sets a value of the three-bit request field 215 based on an operation that the terminal requests the opposing terminal to perform in order to control the PIP included in the multi-view image, and transmits the MVC control message 200 including the set request field 215 to the opposing terminal.

When the request field 215 is set to '000', requesting to turn off the image of the camera, or '001', requesting to turn on the image of the camera, all of the bits of the control field 219 are set to 0. Further, when the request field 215 is set to '010', requesting movement of the image of the camera, the control field 219 is configured in a format 220. Specifically, the control field 219 includes an X field 222 and a Y field 224 for setting a vector value indicating the direction of the move of the image of the camera. The X field 222 indicates the vector of the move of the image of the camera in the horizontal-axis direction, and the Y field 224 indicates the vector of the move of the image of the camera in the vertical-axis direction.

Further, when the request value 215 is set to '011', requesting to change the size of the image of the camera, the control field 219 is configured in a format 230. Specifically, the control field 219 includes a width field 232 and a height field 234 for setting the vertical and horizontal sizes of the image of the camera. The width field 222 indicates a ratio by which the horizontal size of the image of the camera is adjusted, and the height field 234 indicates a ratio by which the vertical size of the image of the camera is adjusted.

The operations respectively corresponding to the fields of Table 3 are exemplary, and various changes may be made to the operations. Further, reserved bit values '101' to '110' may be used as new operations necessary for controlling the PIP included in the multi-view image.

The CAM ID field 217 indicates a unique number for each camera of the opposing terminal. For example, when the opposing terminal has three cameras, the cameras may be assigned 1, 2, and 3 as their respective unique numbers, and the CAM ID value 217 may be set to any one of '001,' '010,' and '011' to indicate the unique number of each camera of the opposing terminal. Further, when the opposing terminal has two cameras, the cameras may be assigned 1 and 2 as their unique numbers, and the CAM ID field 217 may be set to one of '001' and '010' to indicate the unique number of each camera of the opposing terminal.

Additionally, when the opposing terminal has three cameras, the images respectively taken by the cameras are assigned with identification numbers, such as, for example, 1/3 meaning the first of the three cameras, 2/3 meaning the second of the three cameras, or 3/3 meaning the third of the three cameras. The terminal displaying images transmitted from the opposing terminal may differentiate the plurality of images constituting the multi-view image through the identification numbers.

Figure 3:
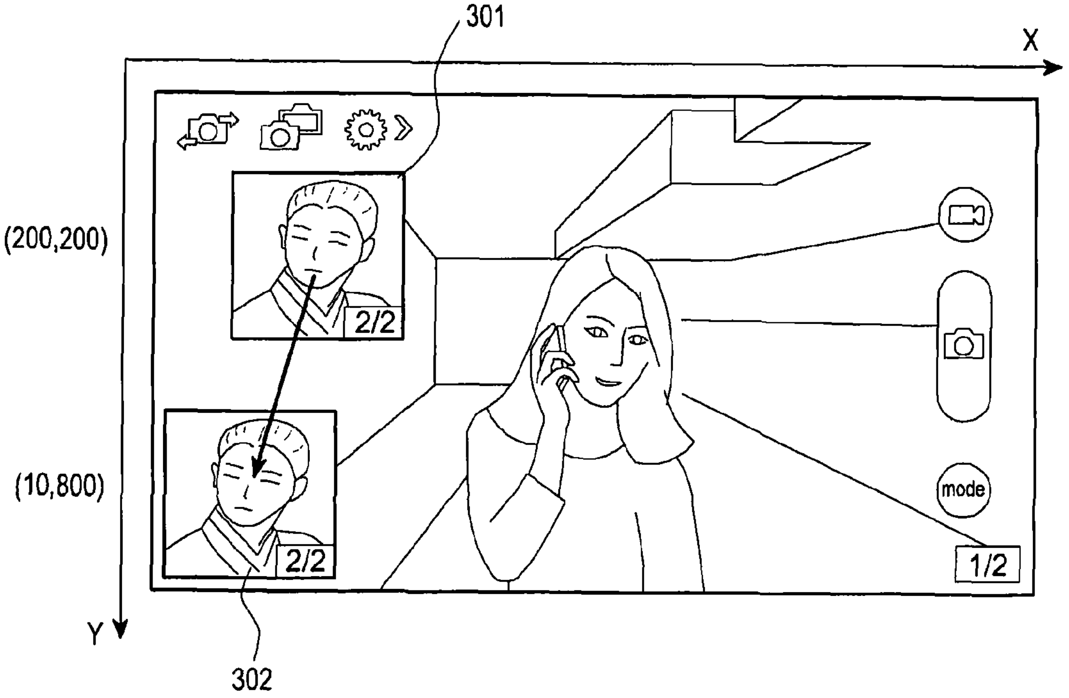
FIG. 3 is a diagram illustrating a terminal relocating a PIP included in a multi-view image in a video call system, according to an embodiment of the present invention.

FIG. 3 is a diagram illustrating a terminal relocating a PIP included in a multi-view image in a video call system, according to an embodiment of the present invention.

Referring to FIG. 3, it is assumed that the user of the terminal performs an MVC with the opposing terminal, and that the opposing terminal has two cameras. Accordingly, a multi-view image that is transmitted from the opposing terminal while the MVC is performed includes an image (denoted as 1/2) taken by a first camera of the opposing terminal, which is a background screen, and an image (denoted as 2/2) taken by a second camera of the opposing terminal, which is a PIP. It is also assumed that the left and upper coordinates (X1,Y1) of the image (2/2) at first position 301 are (200,200). The coordinate X1 indicates the horizontal-axis coordinate of the screen displayed to the user of the terminal, and the coordinate Y1 indicates the vertical coordinate of the screen.

The user of the terminal may freely move the image (2/2) taken by the second camera anywhere in the screen. For example, when the user intends to relocate the image from the first position 301 to a second position 302, the user may do so by dragging the image to the second position 302. Although it is described that the user moves the image to the second position 302 by performing a dragging operation, any other operation may also be applied to relocate the image from the first position 301 to the second position 302.

If the above-described event occurs, the terminal generates vector values for the direction along which the image moves. For example, assuming that the left and upper coordinates (X2,Y2) for the image (2/2) moved to the second position 302 are (10,800), the terminal generates values (−190,600) of a vector (X2−X1,Y2−Y1) using the left and upper coordinates (X2,Y2) for the image (2/2) moved to the second position 302 and the left and upper coordinates (X1,Y1) for the image (2/2) at the first position 301.

The terminal sets each of the request field, CAM ID field, and control field of the MVC control message, and transmits to the opposing terminal in order to control the PIP included in the multi-view image according to the event. That is, the terminal sets the request field to '010' requesting movement of the PIP image, sets the CAM ID field to '010' indicating the camera that captures the moved image, i.e., the second camera, and sets the X field and Y field, respectively, of the control field to the vector values, (−190,600), of the moved image. The X field and the Y field each have 13 bits, and the first bit of the 13 bits indicates the sign (+,−) of the vector value, and the remaining twelve bits indicate the absolute value of the vector value.

Upon receiving the MVC control message configured as above, the opposing terminal identifies the request field, CAM ID field, and control field values, and moves the image taken by the second camera, as indicated by the CAM ID field value, '010,' to the second position 302 according to the vector values (−190,600) indicated by the control field.

The opposing terminal then sets each of the request field and control field included in the MVC control message, and transmits the same to the terminal. That is, the opposing terminal sets the request field to '111' indicating that the request from the terminal for the camera image has been performed, and sets the X field and Y field of the control field to the vector values, (−190,600), respectively, of the moved image.

Figure 4A:
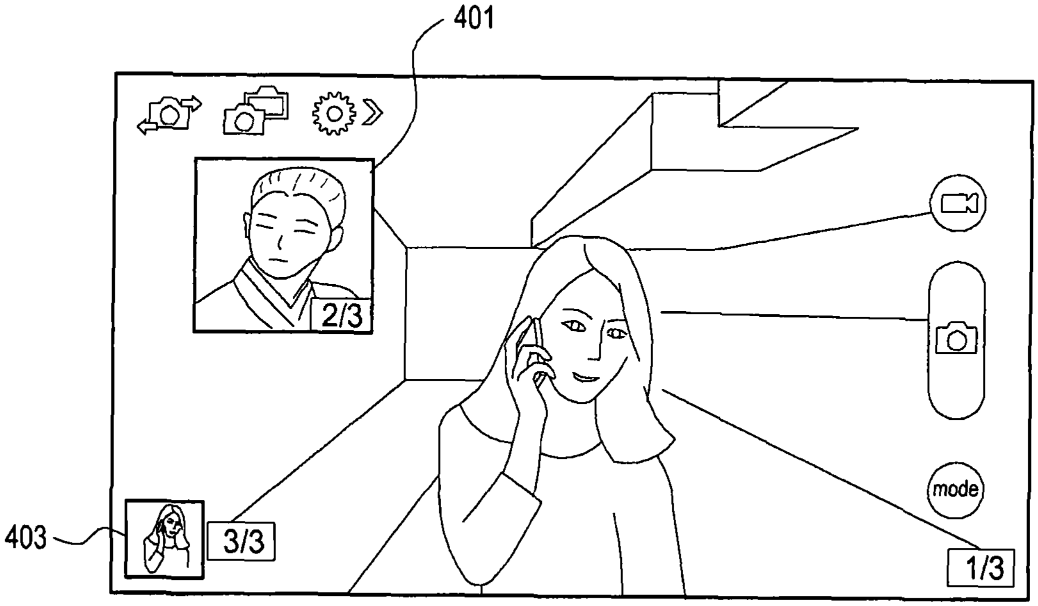
FIGS. 4A and 4B are diagrams illustrating a terminal changing the size of a PIP included in a multi-view image in a video call system, according to another embodiment of the present invention.
Figure 4B:
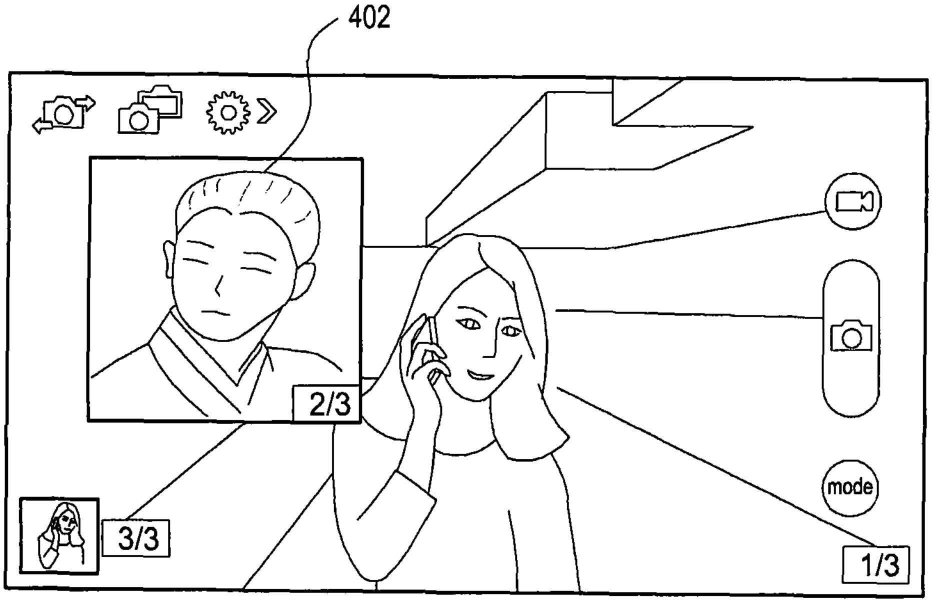

FIGS. 4A and 4B are diagrams illustrating a terminal changing the size of a PIP included in a multi-view image in a video call system, according to another embodiment of the present invention.

Referring to FIGS. 4A and 4B, it is assumed that the user of the terminal performs an MVC with the opposing terminal, and that the opposing terminal has three cameras. Accordingly, as shown in FIG. 4A, a multi-view image that is transmitted from the opposing terminal while the MVC is performed includes an image (denoted as 1/3) taken by a first camera of the opposing terminal, which is a background screen, an image (denoted as 2/3) taken by a second camera of the opposing terminal, which is a PIP, and an image (denoted as 3/3) taken by a third camera of the opposing terminal. It is also assumed that the left and upper coordinates (X1,Y1) of an image 401 denoted as 2/3 are (200,200), and the size of the image 401 is 200×200 pixels. The coordinate X1 indicates the horizontal-axis coordinate of the screen displayed to the user of the terminal, and the coordinate Y1 indicates the vertical coordinate of the screen.

The user of the terminal may freely adjust the size of the image 401 (2/3) and the size of image 403 (3/3) included in the displayed screen. For example, when the user intends to magnify the size the image 401 denoted as 2/3, the user may increase the size of the image 401 to the size of image 402 denoted as 2/3 in FIG. 4B by simultaneously touching two fingers to the image 401 and then expanding the interval between the fingers. Although an embodiment is described in which the user magnifies the size of the image 401 by simultaneously touching two fingers and then expanding the interval between the fingers, any other methods may be applied to magnify or shrink the image 401. For example, the user may increase or reduce the size of the image 401 by dragging one of the other vertexes that serve as a reference in the image 401.

If the above-described event occurs, the terminal determines, for each of the horizontal direction and the vertical direction, a ratio of the distance between the two fingers at a first time when the two fingers are simultaneously touched to the distance between the two fingers at a second time after the interval between the two fingers is adjusted. It is assumed that the ratio in distance between the first time and the second time for each of the horizontal direction and the vertical direction is 1:2, meaning that the size of the image is magnified two times for each of the horizontal direction and the vertical direction.

The terminal sets each of the request field, CAM ID field, and control field of the MVC control message, and transmits to the opposing terminal in order to control the PIP included in the multi-view image. That is, the terminal sets the request field to '011', requesting to change the size of the PIP, sets the CAM ID field to '010', indicating the camera that is capturing the size-changed image, i.e., the second camera, and sets the width field and height field of the Control field to values indicating a ratio at which the image is magnified in the horizontal direction and vertical direction. Specifically, the width field and the height field each are configured with 13 bits, and the width field value and the height field value are each set to 2.

When receiving the MVC control message configured as described above, the opposing terminal identifies the CAM ID field and control field values. The opposing terminal magnifies the image taken by the second camera indicated with the CAM ID field value, '010,' i.e., the image 401 of FIG. 4A, twice for each of the horizontal direction and vertical direction with respect to the coordinates (200,200).

The opposing terminal then sets each of the request field and control field included in the MVC control message, and transmits the same to the terminal. That is, the opposing terminal sets the request field to '111' indicating that the request from the terminal for the camera image has been performed, and sets each of the width field and height field of the control field to 2.

Figure 5A:
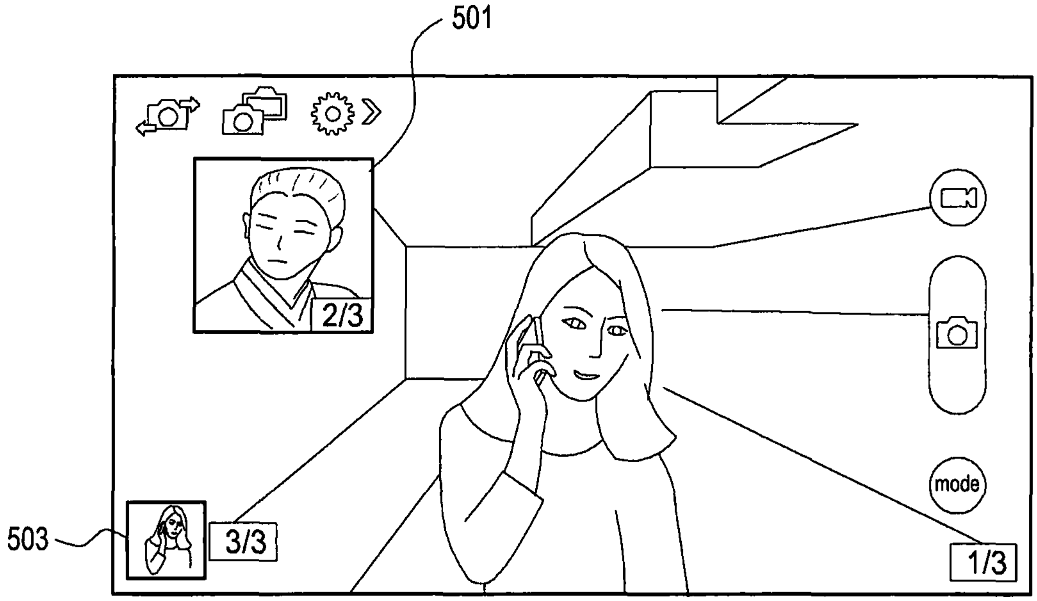
FIGS. 5A and 5B are diagrams illustrating a terminal individually turning on/off a PIP included in a multi-view image in a video call system, according to another embodiment of the present invention.
Figure 5B:
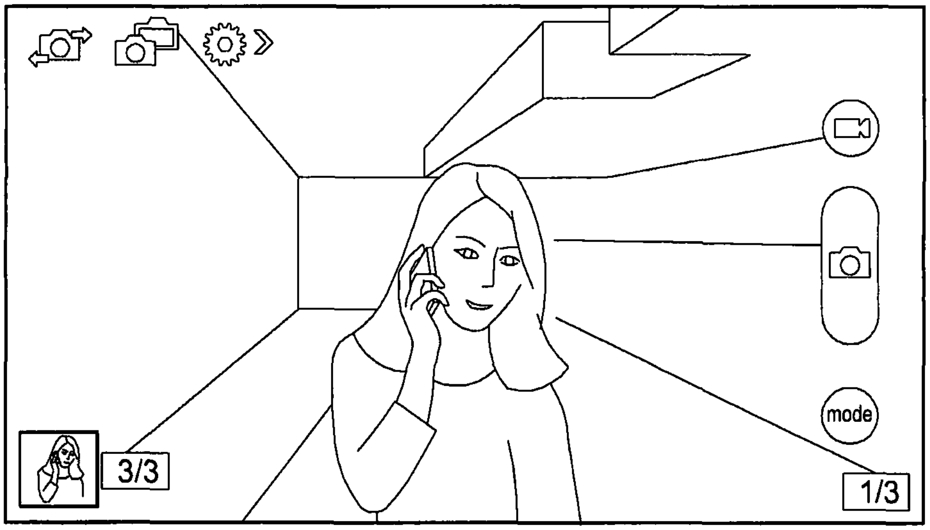

FIGS. 5A and 5B are diagrams illustrating a terminal individually turning on/off a PIP included in a multi-view image in a video call system, according to an embodiment of the present invention.

Referring to FIGS. 5A and 5B, it is assumed that the user of the terminal performs an MVC with the opposing terminal, and that the opposing terminal has three cameras. Accordingly, as shown in FIG. 5A, a multi-view image that is transmitted from the opposing terminal while the MVC is performed includes an image (denoted as 1/3) taken by a first camera of the opposing terminal, which is a background screen, an image (denoted as 2/3) taken by a second camera of the opposing terminal, which is a PIP, and an image (denoted as 3/3) taken by a third camera of the opposing terminal.

The user of the terminal may individually turn on/off the images 501 and 503 included in the displayed screen. For example, when the user intends to turn off the image 501, denoted as 2/3, i.e., intends to remove the image 501 from the displayed screen, the user may do so by touching the image 501 two consecutive times, as shown in FIG. 5B. Although an embodiment is described in which the user removes the image 501 from the displayed screen by touching the image 501 two consecutive times, as an example, any other operation may be applied to turn off the image 501.

If the above-described event occurs, the terminal sets each of the request field and CAM ID field of the MVC control message, and transmits to the opposing terminal in order to control the PIP included in the multi-view image according to the event. That is, the terminal sets the request field to '000', requesting to turn off the PIP on the displayed screen, and sets the CAM ID field to '010', indicating the camera that captures the PIP image to be turned off, i.e., the second camera. In this case, all the bits constituting the control field included in the MVC control message are set to 0.

Upon receiving the MVC control message configured as described above, the opposing terminal identifies the request field and CAM ID field and removes the image taken by the second camera, as indicated by the CAM ID field value, '010,' from the displayed screen.

The opposing terminal sets the request field included in the MVC control message to '111', indicating that the request from the terminal for the camera image has been performed, and transmits the request field-set MVC control message to the terminal.

According to another embodiment of the present invention, if an event occurs requesting to turn on an image that is not currently displayed on the screen among the images taken from the cameras of the opposing terminal, the terminal sets each of the request field and CAM ID field included in the MVC control message depending on the event, and transmits the same to the opposing terminal. That is, the terminal sets the request field to '001', requesting to turn on the image, and the CAM ID field to a value indicating the camera that captures the image. All bits constituting the control field included in the MVC control message are set to 0.

Upon receiving the MVC control message configured as described above, the opposing terminal identifies the request field and CAM ID field and includes the image taken by the camera indicated with the CAM ID field value in the currently displayed screen. The opposing terminal sets the request field included in the MVC control message to '111', indicating that the request from the terminal for the camera image has been performed, and transmits the request field-set MVC control message to the terminal.

According to another embodiment of the present invention, if an event occurs requesting to set any one of the images taken from the cameras of the opposing terminal as the background screen, the terminal sets each of the request field and CAM ID field included in the MVC control message depending on the event, and transmits the same to the opposing terminal. That is, the terminal sets the request field to '100', requesting to set the image as the background screen, and the CAM ID field to a value indicating the camera that captures the image. All bits constituting the control field included in the MVC control message are set to 0.

Upon receiving the MVC control message configured as described above, the opposing terminal identifies the request field and CAM ID field, and sets the image taken by the camera indicated with the CAM ID field value as the background screen. The opposing terminal sets the request field included in the MVC control message to '111', indicating that the request from the terminal for the camera image has been performed, and transmits the Request field-set MVC control message to the terminal.

Figure 6:
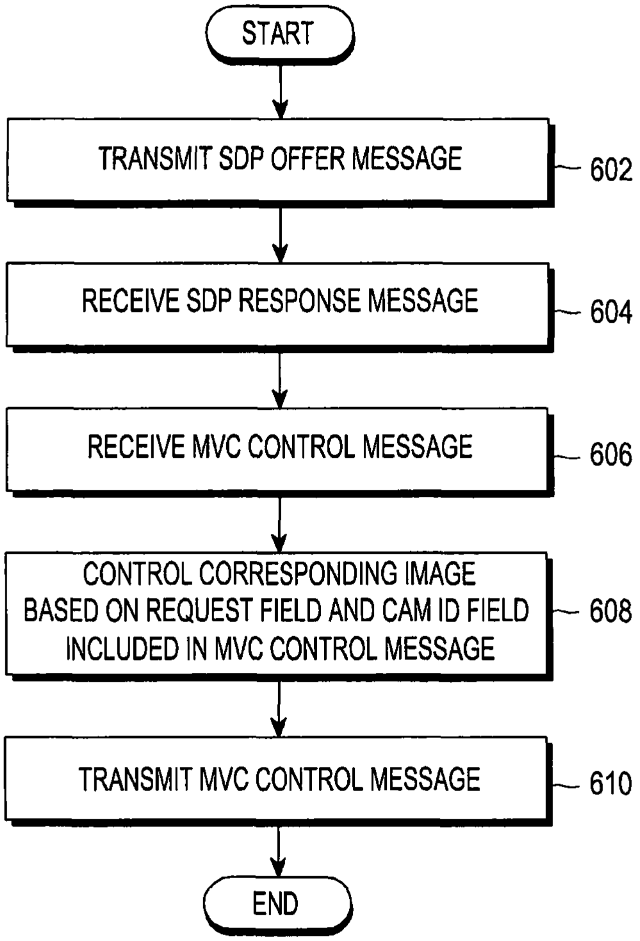
FIG. 6 is a flowchart illustrating an operation in which a transmitting terminal controls a PIP included in a multi-view image provided to a receiving terminal in a video call system, according to an embodiment of the present invention.

FIG. 6 is a flowchart illustrating an operation in which a transmitting terminal controls a PIP included in a multi-view image provided to a receiving terminal in a video call system, according to an embodiment of the present disclosure.

Referring to FIG. 6, a transmitting terminal transmits an SDP offer message for IMS session negotiation to a receiving terminal, in step 602. The SDP offer message includes information related to the number of cameras included in the transmitting terminal.

The transmitting terminal receives an SDP response message from the receiving terminal, in step 604. The SDP response message includes information related to the number of cameras included in the receiving terminal and information related to the number of images, which may be displayed by the receiving terminal, among images provided from the transmitting terminal.

The transmitting terminal receives an MVC control message from the receiving terminal, in step 606. The transmitting terminal controls the image taken by the camera indicated with the CAM ID field value based on the request field and CAM ID field values included in the MVC control message, in step 608. As described above with respect to FIGS. 3, 4A, 4B, 5A, and 5B, the transmitting terminal may turn on/off the image taken by the camera indicated with the CAM ID field value, move the image on the screen, magnify or shrink the image, or set the image as the background screen depending on the request field value.

The transmitting terminal transmits, to the receiving terminal, an MVC control message with the request field set to the value indicating that the request from the receiving terminal for the image taken by the camera indicated with the CAM ID field value has been performed, in step 610.

Figure 7:
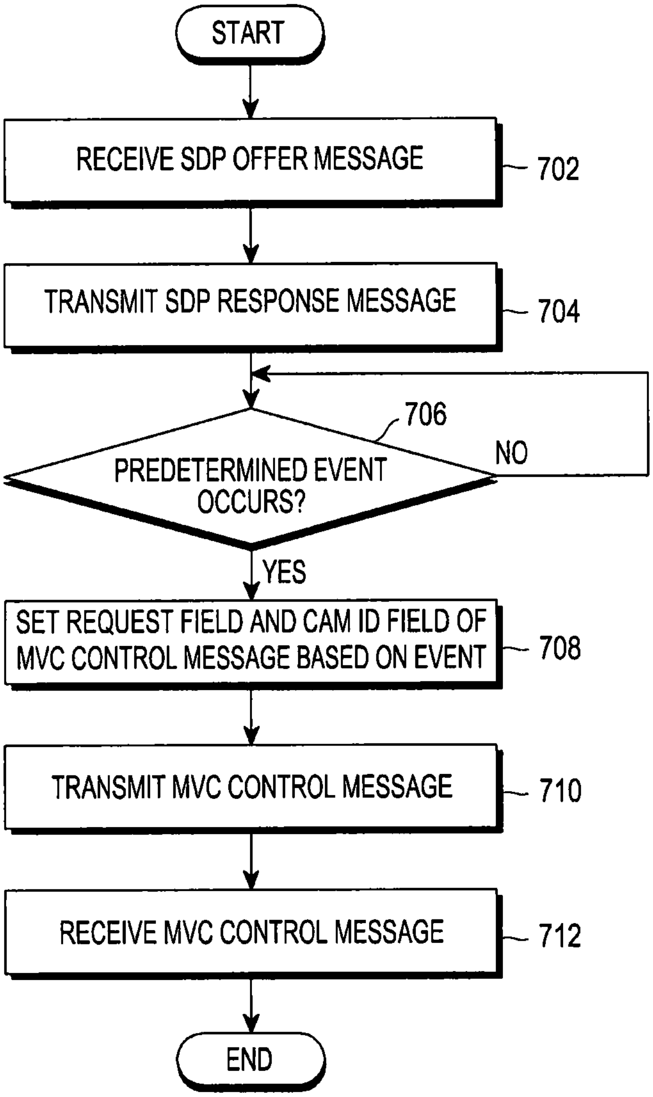
FIG. 7 is a flowchart illustrating an operation in which a receiving terminal transmits, to a transmitting terminal, a message for controlling a PIP included in a multi-view image in a video call system, according to an embodiment of the present invention.

FIG. 7 is a flowchart illustrating an operation in which a receiving terminal transmits, to a transmitting terminal, a message for controlling a PIP included in a multi-view image in a video call system, according to an embodiment of the present invention.

Referring to FIG. 7, a receiving terminal, receives an SDP offer message for IMS session negotiation from a transmitting terminal, in step 702. The SDP offer message includes information related to the number of cameras included in the transmitting terminal.

The receiving terminal transmits an SDP response message to the transmitting terminal, in step 704. The SDP response message includes information related to the number of cameras included in the receiving terminal and information related to the number of images, which may be displayed by the receiving terminal, among images provided from the transmitting terminal.

The receiving terminal identifies whether a predetermined event occurs, in step 706. When the predetermined event does not occur, the receiving terminal repeats step 706.

When the predetermined event occurs, the receiving terminal sets the Request field and CAM ID field values of the MVC control message based on the event that has occurred, in step 708. The predetermined event may be any one of, e.g., an event requesting to turn on/off a particular image, an event requesting to relocate a particular image, an event requesting to change the size of a particular image, and an event requesting to set a particular image as background screen.

The receiving terminal transmits the MVC control message in which the request field and CAM ID field values are set, to the transmitting terminal, in step 710.

The receiving terminal receives, from the transmitting terminal, an MVC control message, which includes the request field set to the value indicating that the request from the receiving terminal for the image taken by the camera indicated with the CAM ID field value has been performed, in step 712.

Figure 8:
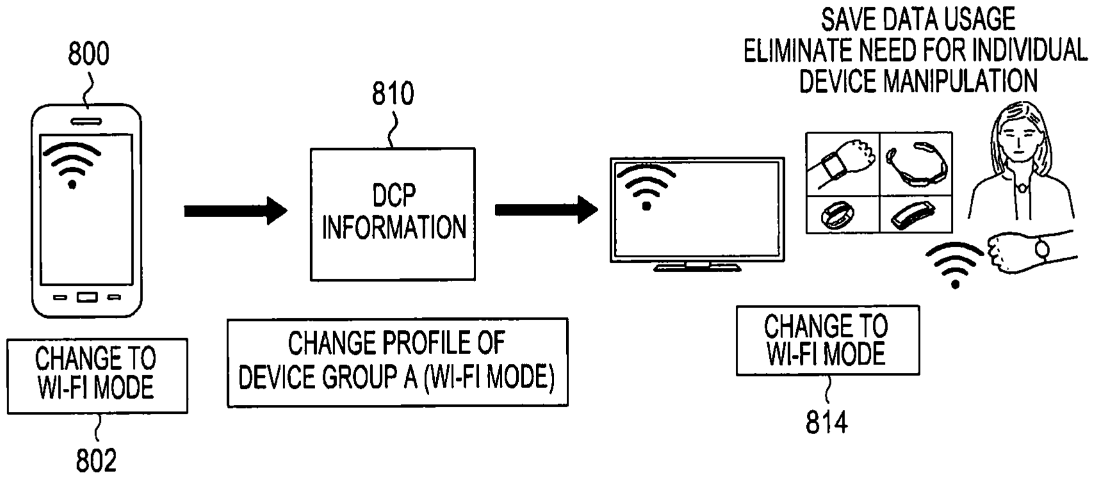
FIG. 8 is a diagram illustrating a user setting a network mode of a device group in a communication system, according to another embodiment of the present invention.

FIG. 8 is a diagram illustrating a user setting a network mode of a device group in a communication system, according to another embodiment of the present invention.

Referring to FIG. 8, it is assumed that the user has a plurality of devices, a predetermined one among the devices owned by the user is a master device, and the other devices are slave devices. Although this embodiment illustrates that a terminal is the master device, any of the user's devices may serve as the master device.

It is also assumed that the master device stores DCP information set as a default profile for each mode so that a service for configuring modes is possible between initial terminals. The DCI information set as a default profile is provided from the service provider.

When the network mode is changed from LTE mode to Wi-Fi mode, in step 802, a terminal (master device) 800 adds information related to the change in the network mode to the user's profile information or presence information, and transmits the same to a server 810. The information related to the change in the network mode may be, e.g., Wi-Fi mode yes/no information indicating whether the terminal 800 is in the Wi-Fi mode.

When the user's profile information or presence information is received from the terminal 800, the server 810 identifies that the network mode of the terminal 800 changes to the Wi-Fi mode and identifies the user preference on the network setting between the terminal 800 and a predetermined device group A. The user preference indicates whether mode synchronization between the master device and the slave device is activated and is stored in the XML document management (XDM) server. In FIG. 8 it is assumed that the device synchronization between the terminal 800 and device group A is activated, and that Wi-Fi mode synchronization between the terminal 800 and device group A is also activated.

The server 810 identifies the DCP information of device group A and changes the network modes of all devices included in device group A to the Wi-Fi mode. Accordingly, the network modes of all devices in device group A are changed to Wi-Fi mode, in step (814), and LTE data usage may be saved. Further, since all of the devices in device group A are collectively changed to the Wi-Fi mode by the server 810, there is no need for individual manipulation for configuring the mode of each of the devices. For example, the user may change the network mode of a smartwatch to the Wi-Fi mode without separate manipulation of the smartwatch, according to an embodiment of the present invention.

Likewise, when the network mode of the terminal 800 is changed from the Wi-Fi mode to the LTE mode, the terminal 800 adds information related to the change in the network mode to the user's profile information or presence information, and transmits the same to the server 810. Thereafter, the server 810 identifies that the network mode of the terminal 800 is changed to the LTE mode and identifies the user preference on the network configuration between the terminal 800 and device group A. Further, upon identifying that synchronization of network settings is activated between the terminal 800 and device group A, the server 810 identifies the DCP information of device group A and changes the network modes of all the devices in device group A to the LTE mode.

Figure 9:
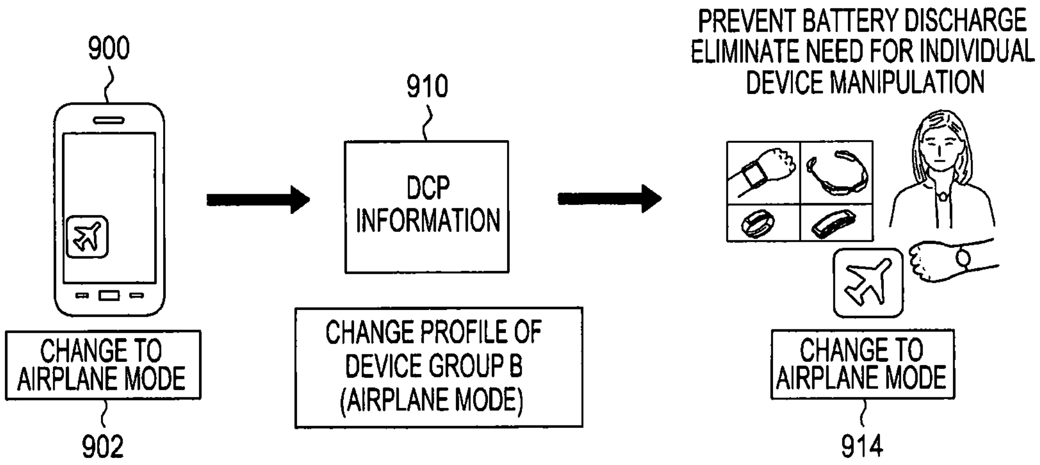
FIG. 9 is a diagram illustrating a user setting an airplane mode of a device group in a communication system, according to another embodiment of the present invention.

FIG. 9 is a diagram illustrating a user setting an airplane mode for a device group in a communication system, according to an embodiment of the present invention.

Referring to FIG. 9, it is assumed that the user has a plurality of devices, a predetermined one of the devices owned by the user is a master device, and the other devices are slave devices. Although a terminal is the master device in this embodiment, any of the user's devices may serve as the master device.

It is also assumed that the master device stores DCP information set as a default profile for each mode so that a service for configuring modes is possible between terminals. The DCI information set as default profile is provided from the service provider.

When the operation mode is changed to airplane mode, in step 902, a terminal (master device) 900 adds information related to the change in the operation mode to the user's profile information or presence information and transmits the same to a server 910. The information related to the change in the operation mode may be, e.g., airplane mode yes/no information indicating whether the terminal 900 is in airplane mode.

When the user's profile information or presence information is received from the terminal 900, the server 910 identifies that the operation mode of the terminal 900 changes to the airplane mode, and identifies the user preference on the airplane mode setting between the terminal 900 and a predetermined device group B. The user preference indicates whether mode synchronization between the master device and the slave device is activated, and is stored in the XDM server. It is assumed that the device synchronization between the terminal 900 and device group B is activated, and that airplane mode synchronization between the terminal 900 and device group B is also activated.

The server 910 identifies the DCP information of device group B and changes the network modes of all devices included in device group B to the airplane mode. Accordingly, the operation modes of all devices in device group B are changed to the airplane mode, in step 914, and all devices owned by the user may be prevented from being battery-discharged on the user's position. Further, since all devices in device group B are collectively changed to the airplane mode by the server 910, there is no need for individual manipulation for configuring the mode of each device.

Likewise, when the operation mode of the terminal 900 is changed from the airplane mode to a basic mode, i.e., the service communication mode, the terminal 900 adds information related to the change in the operation mode to the user's profile information or presence information, and transmits the same to the server 910. Thereafter, the server 910 identifies that the operation mode of the terminal 900 changes to the basic mode, and identifies the user preference on the operation mode setting between the terminal 900 and device group B. Further, upon identifying that synchronization about the airplane mode setting is activated between the terminal 900 and device group B, the server 910 identifies the DCP information of device group B, and changes the operation modes of all the devices in device group B to the basic mode.

Figure 10:
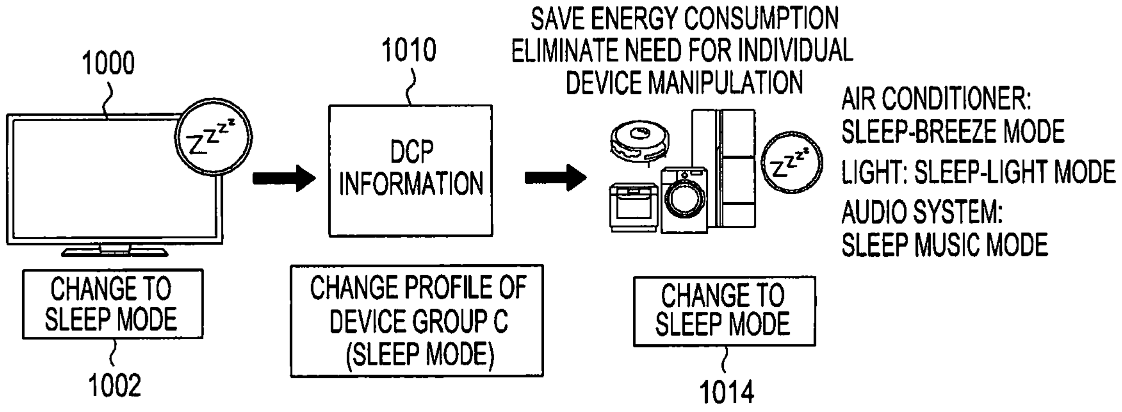
FIG. 10 is a diagram illustrating a user setting a sleep mode of a device group in a communication system, according to another embodiment of the present invention.

FIG. 10 is a diagram illustrating a user setting a sleep mode of a device group in a communication system, according to another embodiment of the present invention.

Referring to FIG. 10, it is assumed that the user has a plurality of devices, a predetermined one of the devices owned by the user is a master device, and the other devices are slave devices. Although a terminal is described as the master device in this embodiment, any of the user's devices may serve as the master device.

It is also assumed that the master device stores DCP information set as a default profile for each mode so that a service for configuring modes is possible between initial terminals. The DCI information set as default profile is provided from the service provider.

When the operation mode is changed to a sleep mode, in step 1002, the terminal (master device) 1000 adds information related to the change in the operation mode to the user's profile information or presence information, and transmits the same to a server 1010. The information related to the change in the operation mode may be, e.g., sleep mode yes/no information indicating whether the terminal 1000 is in the sleep mode.

When the user's profile information or presence information is received from the terminal 1000, the server 1010 identifies that the operation mode of the terminal 1000 changes to the sleep mode and identifies the user preference on the sleep mode setting between the terminal 1000 and a predetermined device group C. The user preference indicates whether mode synchronization between the master device and the slave device is activated, and is stored in the XDM server. It is assumed that the device synchronization between the terminal 1000 and device group C is activated, and that the sleep mode synchronization between the terminal 1000 and device group C is also activated.

The server 1010 identifies the DCP information of device group C, and changes the operation modes of all devices in device group C to the sleep mode. Accordingly, the operation modes of all devices in device group C are changed to the sleep mode, in step 1014. For example, assuming that the devices included in device group C are an air conditioner, a light, and an audio system, the operation mode of the air conditioner changes to a sleep breeze mode, the light changes to a sleep light mode, and the audio system changes to a sleep music mode. Therefore, energy consumption may be saved. Further, since all devices in device group C are collectively changed to the sleep mode by the server 1010, there is no need for individual manipulation for configuring the mode of each device.

Likewise, when the operation mode of the terminal 1000 is changed from the sleep mode to the basic mode, i.e., the service communication mode, the terminal 1000 adds information related to the change in the operation mode to the user's profile information or presence information, and transmits the same to the server 1010. Thereafter, the server 1010 identifies that the operation mode of the terminal 1000 changes to the basic mode, and identifies the user preference on the sleep mode setting between the terminal 1000 and device group C. Further, upon identifying that sleep mode synchronization is activated between the terminal 1000 and device group C, the server 1010 identifies the DCP information of device group C and changes the operation modes of all devices in device group C to the basic mode.

Figure 11:
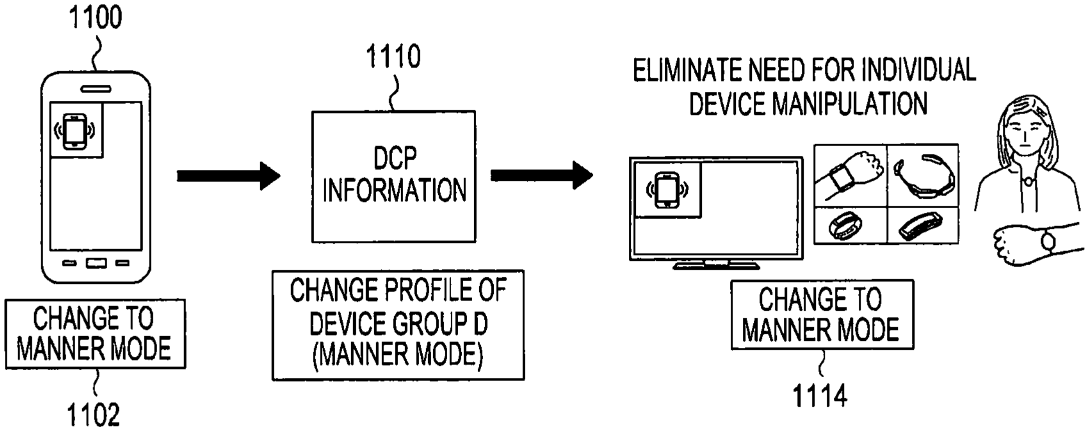
FIG. 11 is a diagram illustrating a user setting a manner mode of a device group in a communication system, according to another embodiment of the present invention.

FIG. 11 is a diagram illustrating a user setting a manner mode of a device group in a communication system, according to another embodiment of the present invention.

Referring to FIG. 11, it is assumed that the user has a plurality of devices, a predetermined one among the devices owned by the user is a master device, and the other devices are slave devices. Although a terminal is described as the master device in this embodiment, any of the user's devices may serve as the master device.

It is also assumed that the master device stores DCP information set as a default profile for each mode so that a service for configuring modes is possible between initial terminals. The DCI information set as default profile is provided from the service provider.

When the operation mode is changed to manner mode, in step 1102, a terminal (master device) 1100 adds information related to the change in the operation mode to the user's profile information or presence information, and transmits the same to a server 1110. The information related to the change in the operation mode may be, e.g., manner mode yes/no information indicating whether the terminal 1100 is in the manner mode.

When the user's profile information or presence information is received from the terminal 1100, the server 1110 identifies that the operation mode of the terminal 1100 changes to the manner mode, and identifies the user preference on the manner mode setting between the terminal 1100 and a predetermined device group D. The user preference indicates whether mode synchronization between the master device and the slave device is activated, and is stored in the XDM server. It is assumed that the device synchronization between the terminal 1100 and device group D is activated, and that manner mode synchronization between the terminal 1100 and device group D is also activated.

The server 1110 identifies the DCP information of device group D and changes the network modes of all devices included in device group D to the manner mode. Accordingly, all devices in device group D are changed to manner mode, in step 1114. Since all devices in device group D are collectively changed to manner mode by the server 1110, the user need not perform individual manipulation for configuring the mode of each device.

Likewise, when the operation mode of the terminal 1100 is changed from the manner mode to the ringer mode or the silent mode, the terminal 1100 adds information related to the change in the operation mode to the user's profile information or presence information, and transmits the same to the server 1110. Thereafter, the server 1110 identifies that the operation mode of the terminal 1100 changes to the ringer mode or the silent mode, and identifies the user preference on the operation mode setting between the terminal 1100 and device group D. Further, upon identifying that synchronization about the manner mode setting is activated between the terminal 1100 and device group D, the server identifies the DCP information of device group D and changes the operation modes of all devices in device group D to the ringer mode or the silent mode.

Figure 12:
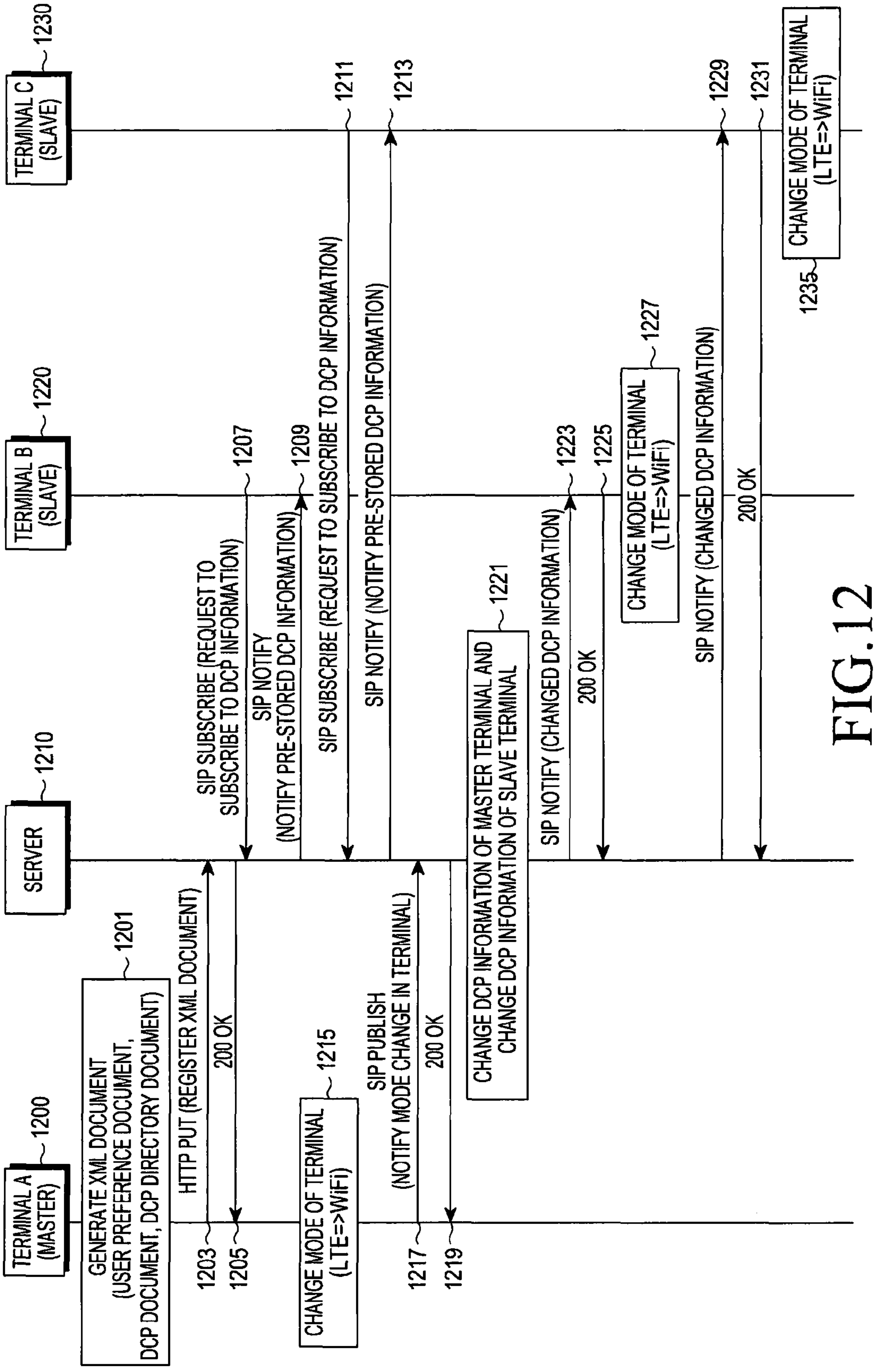
FIG. 12 is a signal flowchart illustrating a procedure in which a master device changes modes of a slave device in a communication system, according to another embodiment of the present invention.

FIG. 12 is a signal flowchart illustrating a procedure in which a master device changes modes of a slave device in a communication system, according to another embodiment of the present invention.

Referring to FIG. 12, the communication system includes a terminal A (master device) 1200, a server 1210, a terminal B (slave device) 1220, and a terminal C (slave device) 1230.

Terminal A 1200 generates an XML document for configuring a terminal context, in step 1201. The XML document includes, e.g., a user preference document, a DCP document, and a DCP directory document for configuring the terminal context.

The user preference document includes information related to whether mode synchronization is established between the master device and the slave devices. The DCP document includes rules respectively applying to terminal modes, e.g., a rule applying to Wi-Fi mode, a rule applying to airplane mode, a rule applying to sleep mode, a rule applying to manner mode, and a rule applying to roaming mode. The DCP directory document includes information related to the profile activated in the DCP document, e.g., per-terminal DCP information, a wearable device list, a home device list, a master device list, DCP information operating in the master device, DCP information according to a change in mode of the master device (e.g., a rule corresponding to a relevant mode), DCP information operating in the slave devices, and DCP information separately applied among the slave devices.

Terminal A 1200 transmits an HTTP PUT message, requesting to register the XML document, to the server 1210, in step 1203. The server 1210 registers the XML document, and in response to the HTTP PUT message, transmits a 200 OK message to terminal A 1200, in step 1205.

Terminal B 1220 transmits an SIP SUBSCRIBE message for subscribing to DCP information to the server 1210, in step 1207. The DCP information refers to, for example, the user preference document, the DCP document, and the DCP directory document. The SIP SUBSCRIBE message transmitted includes information requesting to subscribe to DCP information. Terminal B 1220 may receive varied DCP information by transmitting the SIP SUBSCRIBE message including the information requesting to subscribe to the DCP information. The server 1210 notifies terminal B 1220 of pre-stored DCP information by transmitting an SIP NOTIFY message in response to the SIP SUBSCRIBE message, in step 1209. Although the DCP information is described as being obtained through steps 1207 and 1209 in this embodiment, the DCP information may be obtained by periodically reading the DCP information (XCAP GET) by terminal B 1220.

Terminal C 1230 transmits an SIP SUBSCRIBE message for subscribing to DCP information to the server 1210, in step 1211. The SIP SUBSCRIBE message includes information requesting to subscribe to DCP information. Terminal C 1230 may receive varied DCP information by transmitting the SIP SUBSCRIBE message including the information requesting to subscribe to the DCP information. The server 1210 notifies terminal C 1230 of the pre-stored DCP information by transmitting an SIP NOTIFY message in response to the SIP SUBSCRIBE message, in step 1213. Although the DCP information is described herein as being obtained through steps 1211 and 1213, the DCP information may be obtained by periodically reading the DCP information (XCAP GET) by terminal C 1230.

If the network mode is changed from LTE mode to Wi-Fi mode, in step 1215, terminal A 1200 transmits an SIP PUBLISH message to the server 1210 to notify of the terminal mode change, in step 1217. The mode change in terminal A 1200 may be directly made by the user or may be made automatically by the terminal. Further, the SIP PUBLISH message may be transmitted depending on whether the mode synchronization between terminal A 1200 and the relevant slave device has been established. That is, the SIP PUBLISH message may be transmitted when the mode synchronization has been established. Further, the server 1210 transmits a 200 OK message to terminal A 1200 in response to the SIP PUBLISH message, in step 1219.

The server 1210 changes the DCP information of the master device based on the mode change in terminal A 1200, and changes the DCP information of the slave device, in step 1221.

Thereafter, the server 1210 notifies terminal B 1220 of the changed DCP information by transmitting an SIP NOTIFY message, in step 1223. Terminal B 1220 transmits an OK message to the server 1210 in response to the SIP NOTIFY message, in step 1225, and changes the network mode from the LTE mode to the Wi-Fi mode based on the changed DCP information, in step 1227.

Further, the server 1210 notifies terminal C 1230 of the changed DCP information by transmitting an SIP NOTIFY message, in step 1229. Terminal C 1230 transmits an OK message to the server 1210 in response to the SIP NOTIFY message, in step 1231, and changes the network mode from the LTE mode to the Wi-Fi mode based on the changed DCP information, in step 1235.

Figure 13:
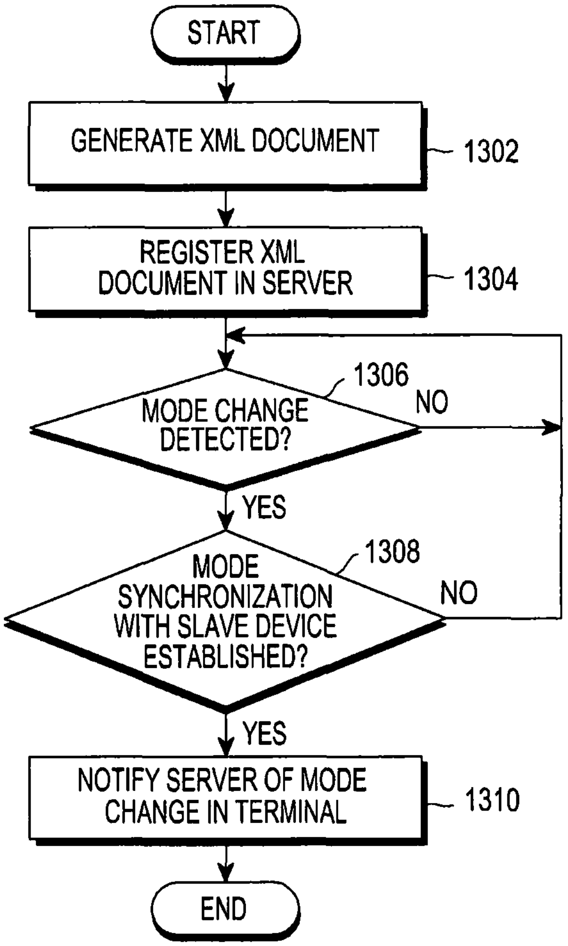
FIG. 13 is a flowchart illustrating an operation in which a master device changes modes of a slave device in a communication system, according to another embodiment of the present invention.

FIG. 13 is a flowchart illustrating an operation in which a master device changes modes of a slave device in a communication system, according to an embodiment of the present invention.

Referring to FIG. 13, the master device generates an XML document, in step 1302. The XML document includes at least one of a user preference document, a DCP document, and a DCP directory document for configuring the terminal context. Further, the user preference document includes information related to whether synchronization is established between the master device and the slave device, the DCP document includes rules respectively applied to modes, and the DCP directory document includes information related to the profile activated in the DCP document.

The master device registers the XML document, i.e., at least one of the user preference document, the DCP document, and the DCP directory document, in the server, in step 1304.

The master device examines whether its mode change is detected, in step 1306. When the mode change is not detected, the master device repeats step 1306. When the mode change is detected, the master device determines whether mode synchronization with the slave device is established, in step 1308. When mode synchronization with the slave device is not established, the master device returns step 1306 to repeat the examining operation.

When mode synchronization with the slave device is established, the master device notifies the server of the changes, in step 1310.

Figure 14:
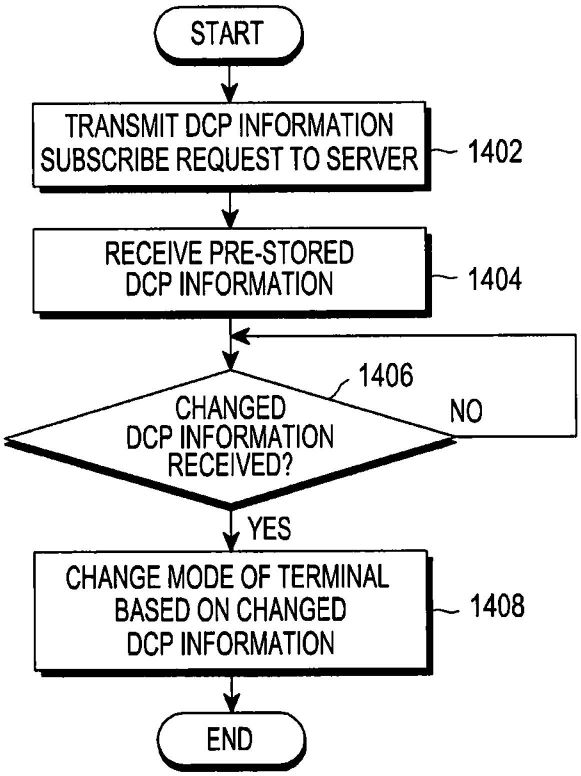
FIG. 14 is a flowchart illustrating an operation in which a slave device changes modes in a communication system, according to another embodiment of the present invention.

FIG. 14 is a flowchart illustrating an operation in which a slave device changes modes in a communication system, according to an embodiment of the present invention.

Referring to FIG. 14, the slave device transmits, to the server, a DCP information subscribe request indicating whether to subscribe to at least one of a user preference document, a DCP document, and a DCP directory document, in step 1402. The reason for transmitting the DCP information subscribe request is to allow the slave device to receive a change in DCI information, e.g., at least one of the user preference document, DCP document, and DCP directory document. The slave device receives pre-stored DCP information from the server, in step 1404. The pre-stored DCP information means DCP information currently stored in the server, e.g., DCP information set as default profile for each mode provided from the service provider.

The slave device determines whether changed DCP information based on a mode change in the master device is received from the server, in step 1406. When no changed DCP information is received, the slave device repeats step 1406.

When changed DCP information is received, the slave device changes its mode based on the changed DCP information, in step 1406.

Figure 15:
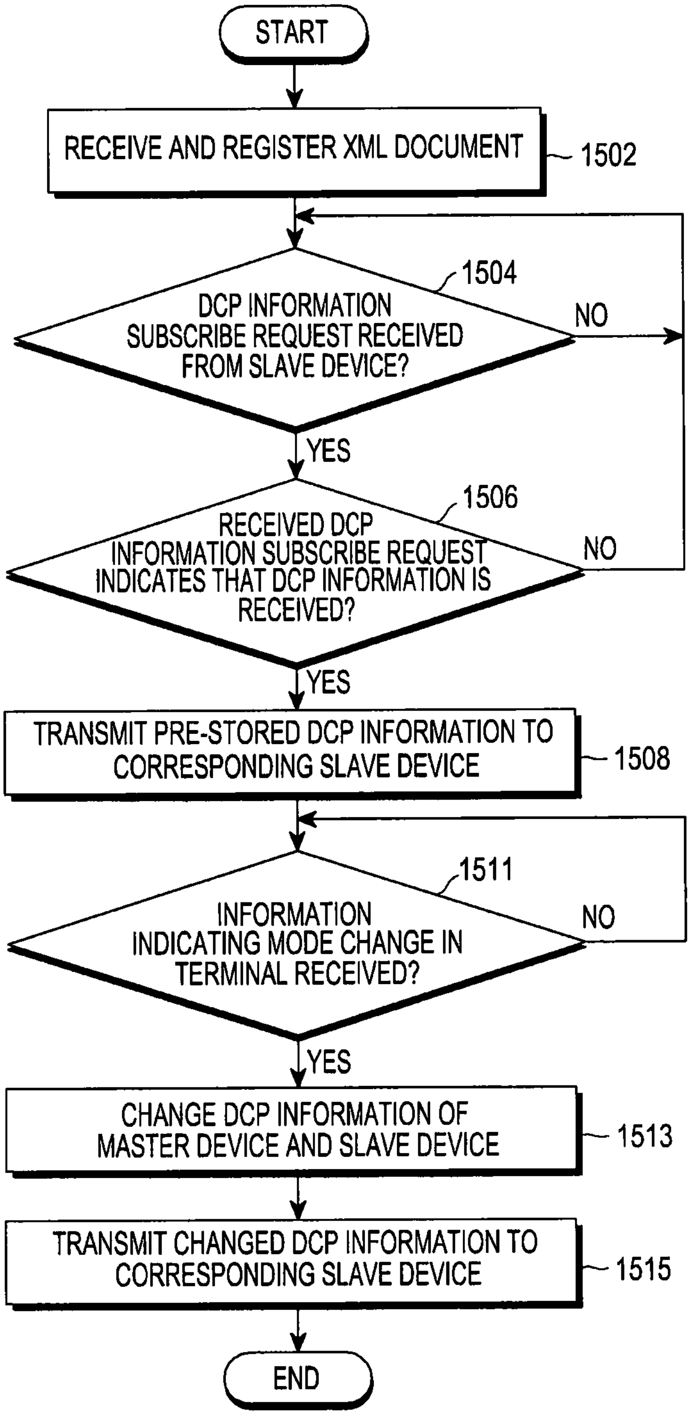
FIG. 15 is a flowchart illustrating an operation in which a server changes modes of a slave device in a communication system, according to another embodiment of the present invention.

FIG. 15 is a flowchart illustrating an operation in which a server changes modes of a slave device in a communication system, according to another embodiment of the present invention.

Referring to FIG. 15, the server receives an XML document from the master device and registers the XML document, in step 1502. The XML document includes at least one of a user preference document, a DCP document, and a DCP directory document for configuring the terminal context. Further, the user preference document includes information related to whether synchronization is established between the master device and the slave device, the DCP document includes rules respectively applied to modes, and the DCP directory document includes information related to the profile activated in the DCP document.

The server determines whether a DCP information subscribe request is received from the slave device, in step 1504. When the DCP information subscribe request is not received from the slaved device, the server repeats step 1504. When the DCP information subscriber request is received, the server determines whether the received DCP information subscribe request indicates that DCP information, e.g., at least one of a user preference document, a DCP document, and a DCP directory document, is received.

When the received DCP information subscribe request indicates that no DCP information is received, the server returns to step 1504.

When the received DCP information subscribe request indicates that the DCP information is received, the server transmits pre-stored DCP information to the slave device, in step 1508.

The server determines whether mode change-related information is received from the master device, in step 1511. When no mode change-related information is received, the server repeats step 811. When the mode change-related information is received, the server changes the DCP information of the master device and the slave device, in step 1513.

The server transmits the changed DCP information to the slave device, in step 1515. FIG. 16 is a user preference document constituting an XML document for configuring a terminal context, according to an embodiment of the present invention.

Referring to FIG. 16, the user preference document indicates whether mode synchronization is activated between devices, and the element, <mode-sync>, for mode synchronization in the user preference document is configured as follows. Specifically, the user preference document includes information indicating whether <mode-sync> is activated, e.g., the 'state' attribute indicating an operation state (on/off), and further includes <wifi-sync> indicating whether Wi-Fi mode synchronization is established, <airplane-sync> indicating whether airplane mode synchronization is activated, <sleep-sync> indicating whether sleep mode synchronization is activated, <manner-sync> indicating whether manner mode synchronization is activated, and <roaming-sync> indicating whether roaming mode synchronization is activated.

Further, in the user preference document shown, <mode-sync state="on"> indicates that mode synchronization between the devices is activated, <wifi-sync> true </wifi-sync> indicates that Wi-Fi mode synchronization between the devices is activated, <airplane-sync> true </airplane-sync> indicates that airplane mode synchronization between the devices is activated, <sleep-sync> true </sleep-sync> indicates that sleep mode synchronization is activated between the devices, <manner-sync> true </manner-sync> indicates that manner mode synchronization is activated between devices, and <roaming-sync> true </roaming-sync> indicates that roaming mode synchronization is activated between the devices.

FIGS. 17A-17D is a DCP document constituting an XML document for configuring a terminal context.

The DCP document includes rules respectively applied to terminal modes, and FIGS. 17A-17D shows rules respectively applied to LTE mode, Wi-Fi mode, airplane mode, and sleep mode. When 'sip:ronald.underwood@example.com' is provided as an SIP URI for user identification, the DCP document is defined with a per-mode 'rule' in the [RFC4745] 'ruleset' document, and the DCP document defines actions under conditions.

FIG. 17A shows an LTE profile that is a rule applied to the LTE mode, and when 'id'attribute (id="f3g44r1") is defined and a condition is an LTE connection, notification of the user's subscribed services, call/data usage/remaining balance update, is defined to be delivered to the device group.

Further, notification of Message, e.g., short message service (SMS), multimedia messaging service (MMS), or Join message, is also defined to be transferred to the device group, and notification of third party services, e.g., social networking service (SNS) or email services is defined to be blocked. Other necessary actions, e.g., automatic update of various applications (Apps), may be defined as well.

FIG. 17B shows a Wi-Fi profile that is a rule applied to Wi-Fi mode, and when 'id'attribute (id="ythk764") is defined and a condition is a Wi-Fi connection, notification of the user's subscribed services is defined to be delivered to the device group. Further, notification of message and third party services is defined to be delivered as well. Other necessary actions may be defined as well.

FIG. 17C shows an airplane mode profile that is a rule applied to airplane mode, and when 'id'attribute (id="11t2t45") is defined and a condition is airplane mode, notification of the user's subscribed services is defined to be blocked. Further, notification of message and third party services is defined to be blocked, and the data connection is defined to be deactivated. Other necessary actions may be defined as well.

FIG. 17D shows a sleep mode profile that is a rule applied to sleep mode, and when 'id'attribute (id="ythk764") is defined and a condition is sleep mode, notification of the user's subscribed services is defined to be blocked. Further, notification of message and third party services is defined to be blocked as well. Further, the terminal and tablet PC are defined to activate the maximum power saving mode, and the air conditioner and light are defined to activate the sleep mode. Other necessary actions may be defined as well.

The roaming profile applied to the roaming mode, when 'id'attribute(id="ythk764") is defined and a condition is a Wi-Fi connection, is defined to deliver notification for the user's subscribed services to the device group. Further, notification of message and third party services is defined to be delivered as well. Other necessary actions may be defined as well.

FIG. 18 is a DCP directory constituting an XML document for configuring a terminal context of a device group, according to an embodiment of the present invention.

Referring to FIG. 18, the application server changes the profiles of the slave devices included in the group to the LTE profile, Wi-Fi profile, roaming profile, airplane profile, and sleep mode profile, when the profile of the master device is changed.

FIGS. 19A-19D are DCP directory documents constituting an XML document for configuring a terminal context of a device group, according to an embodiment of the present invention.

Referring to FIGS. 19A-19D, <dcp-set> denotes a set of DCP information. FIGS. 19A-19D show the DCP information of each of the LTE mode, the Wi-Fi mode, the roaming mode, the airplane mode, and the sleep mode.

<dp-set> denotes a set of the devices related to the device profiles. FIGS. 19A-19D show a wearable device list, a home device list, and a master device list.

<active-dcp> denotes a set of DCP information activated in the device, and <master-dcp> denotes the DCP information activated in the master device.

<ruleset> denotes a set of device context profile rules according to changes in the terminal's mode, i.e., a set of rules corresponding to changed modes. For example, if the master device changes to roaming mode, the profile of the slave device changes to the roaming profile and operates.

<slave-device-dcp-set> denotes a set of DCP information activated in the slave device. For example, when the master device changes to airplane mode (ghi6k), the slave device, wearable device (aaa111), also changes to airplane mode.

<active-device-dcp-set> denotes a set of terminals separately applied with a device context profile among the terminals.

The structure of the DCP directory document described above in connection with FIGS. 19A-19D may be standardized and implemented in a form that is partially modified for necessity and expandability.

Further, methods according to embodiments of the present invention may also be applicable to cases where data is shared between devices. An example where data is shared between devices may be when a tethering service is performed between the master device and the wearable device. That is, basic rules related to the network mode and operation modes described above may be configured and may be then changed by the user.

Further, when the above-described DCP information, i.e., the rules respectively applied to the modes, is stored in the server, and even when there is a limited or no input method through a device, data sharing per data group is possible through comprehensive application. In other words, using the tethering service as an example, if the master terminal activates the tethering service by generating a tethering profile, a particular device group may access the master device through the tethering service to communicate data services.

Further, in the case of device-based services, and not server-based services, settings need to be made per device, which is burdensome, and if service rules/settings collide with each other, these need to be adjusted. Such may be addressed through the DCP information.

Figure 20:
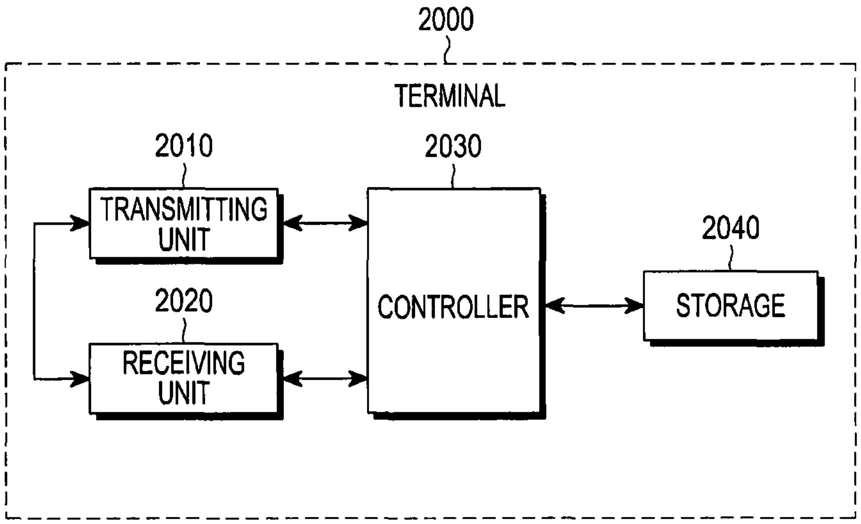
FIG. 20 is a block diagram illustrating an internal configuration of a device (e.g., a terminal) changing modes in a communication system, according to another embodiment of the present invention.

FIG. 20 is a block diagram illustrating an internal configuration of a device (e.g., a terminal) changing modes in a communication system, according to an embodiment of the present invention.

Referring to FIG. 20, a terminal 2000 includes a transmitting unit 2010, a receiving unit 2020, a controller 2030, and a storage 2040. The configuration illustrated in FIG. 20 may apply to both the master device and slave device.

The controller 2030 controls the overall operation of the terminal 2000. In particular, the controller 2030 performs controls to conduct the overall operation related to changing terminal modes, according to an embodiment of the present invention. The overall operation related to changing the terminal modes is the same as those described above in connection with FIGS. 12 to 14.

The transmitting unit 2010 transmits various messages under the control of the controller 2030. The various messages transmitted from the transmitting unit 2010 are the same as those described above in connection with FIGS. 12 to 14.

The receiving unit 2020 receives various messages under the control of the controller 2030. The various messages received by the receiving unit 2020 are the same as those described above in connection with FIGS. 12 to 14.

Figure 21:
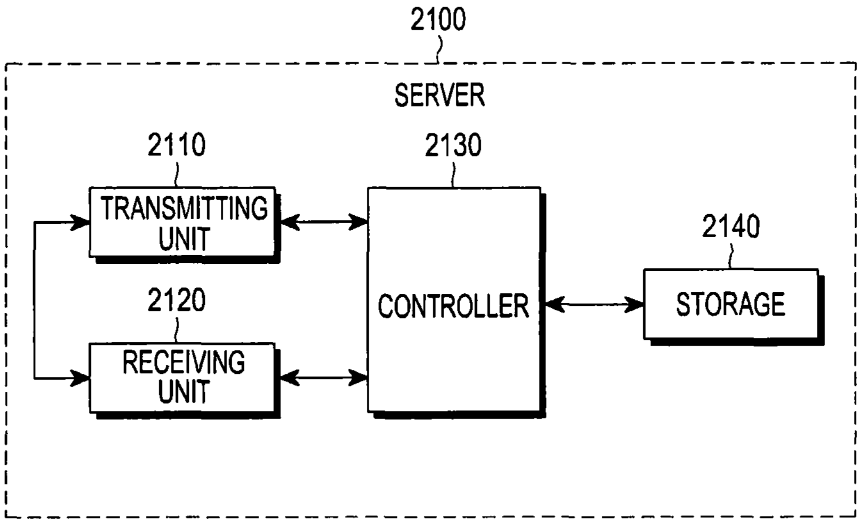
FIG. 21 is a block diagram illustrating an internal configuration of a server changing modes of a device in a communication system, according to another embodiment of the present invention.

FIG. 21 is a block diagram illustrating an internal configuration of a server changing modes of a device in a communication system, according to an embodiment of the present invention.

Referring to FIG. 21, a server 2100 includes a transmitting unit 2110, a receiving unit 2120, a controller 2130, and a storage 2140.

The controller 2130 controls the overall operation of the server 2100. In particular, the controller 2130 performs controls to conduct the overall operation related to changing modes of the device, according to an embodiment of the present invention. The overall operation related to changing the modes of device is the same as those described above in connection with FIGS. 12 and 15.

The transmitting unit 2110 transmits various messages under the control of the controller 2130. The various messages transmitted from the transmitting unit 2110 are the same as those described above in connection with FIGS. 12 and 15.

The receiving unit 2120 receives various messages under the control of the controller 2130. The various messages received by the receiving unit 2120 are the same as those described above in connection with FIGS. 12 and 15.

The methods for controlling a multi-view image, according to embodiments of the present invention, may be implemented in hardware, software, or a combination of hardware and software. Such software may be stored in a volatile or non-volatile storage device such as a read-only memory (ROM) or other storage devices, a memory, such as a random access memory (RAM), a memory chip, a device or an integrated circuit, or a storage medium, such as, e.g., a compact disc (CD), a digital versatile disc (DVD), a magnetic disk, or a magnetic tape, which allows for optical or magnetic recording while simultaneously being read out by a machine (e.g., a computer). The methods for changing a mode of a device, according to an embodiment of the present invention, may be implemented by a computer or portable terminal including a controller and a memory, and the memory may be an example of a storage medium that may be read out by a machine appropriate to store a program or programs including instructions for realizing embodiments of the present invention.

Accordingly, embodiments of the present invention encompass a program containing codes for implementing the device or method set forth herein and a machine (e.g., computer)-readable storage medium storing the program. The program may be electronically transferred via any media, such as, for example, communication signals transmitted through a wired or wireless connection, and the present invention includes equivalents thereof.

The apparatuses for controlling a multi-view image, according to embodiments of the present invention, may receive the program from a program providing device wiredly or wirelessly connected thereto, and may store the same. The program providing device may include a memory for storing a program including instructions to enable a device mode changing apparatus to perform a device mode changing method and for storing information necessary for the device mode changing method, may include a communication unit for performing wired or wireless communication with the device mode changing apparatus, and may include a controller for transmitting the program to the communication device automatically or at the request of the device mode changing apparatus.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A method for changing a mode by a server, the method comprising:

receiving, from a master device, first information related to a mode activated in the master device;

identifying at least one slave device synchronized with a mode of the master device based on the first information;

generating second information related to a mode of the identified at least one slave device based on third information related to a rule applied per mode of the master device and the identified at least one slave device; and transmitting, to the identified at least one slave device, the second information, wherein the second information is used for mode synchronization between the master device and the identified at least one slave device.

2. The method of claim 1, wherein the mode activated in the master device is at least one of a Wi-Fi mode, an airplane mode, a sleep mode, a manner mode that indicates one of a ringer mode and a silent mode, and a roaming mode.

3. The method of claim 1, wherein the second information is generated based on fourth information related to whether synchronization is activated between a mode of the master device and a mode of the identified at least one slave device.

4. The method of claim 1, wherein the first information further comprises a device list comprising information related to at least one slave device.

5. A method for changing a mode of a slave device by a master device, the method comprising:

generating first information related to a mode activated in the master device; and transmitting, to a server, the first information, wherein the first information is used for identifying at least one slave device synchronized with a mode of the master device and for generating second information related to the mode of the identified at least one slave device, and wherein the second information is generated based on information related to a rule applied per mode of the master device and the identified at least one slave device and is used for mode synchronization between the master device and the identified at least one slave device.

6. A server for changing a mode, the server comprising:

a receiving unit configured to receive, from a master device, first information related to a mode activated in the master device;

a controller configured to identify at least one slave device synchronized with a mode of the master device based on the first information, and generate second information related to a mode of the identified at least one slave device based on third information related to a rule applied per mode of the master device and the identified at least one slave device; and a transmitting unit configured to transmit, to the identified at least one slave device, the second information, wherein the second information is used for mode synchronization between the master device and the identified at least one slave device.

7. A master device for changing a mode of a slave device, the master device comprising:

a controller configured to generate first information related to a mode activated in the master device; and a transmitting unit configured to transmit, to a server, the first information, wherein the first information is used for identifying at least one slave device synchronized with a mode of the master device and for generating second information related to the mode of the identified at least one slave device, and wherein the second information is generated based on information related to a rule applied per mode of the master device and the identified at least one slave device and is used for mode synchronization between the master device and the identified at least one slave device.

8. A method for changing a mode by a slave device, the method comprising:

receiving, from a server, first information related to a mode of the slave device; and changing a mode of the slave device based on the first information, wherein the first information is generated based on information related to a mode activated in a master device, and is generated based on information related to a rule applied per mode of the master device and at least one slave device to be synchronized with a mode of the master device, and wherein the first information is used for mode synchronization between the master device and the at least one slave device.

9. A slave device for changing a mode, the slave device comprising:

a receiving unit configured to receive, from a server, first information related to a mode of the slave device; and a controller configured to change a mode of the slave device based on the first information, wherein the first information relates to a mode activated in a master device, and is generated based on information related to a rule applied per mode of the master device and at least one slave device to be synchronized with a mode of the master device, and wherein the first information is used for mode synchronization between the master device and the at least one slave device.

10. The method of claim 5, wherein the mode activated in the master device is at least one of a Wi-Fi mode, an airplane mode, a sleep mode, a manner mode that indicates one of a ringer mode and a silent mode, and a roaming mode.

11. The method of claim 5, further comprising:

transmitting second information related to a rule applied per mode of the master device and the at least one slave device.

12. The method of claim 5, wherein the first information further comprises a device list comprising information related to the at least one slave device.

13. The server of claim 6, wherein the mode activated in the master device is at least one of a Wi-Fi mode, an airplane mode, a sleep mode, a manner mode that indicates one of a ringer mode and a silent mode, and a roaming mode.

14. The server of claim 6, wherein the second information is generated based on fourth information related to whether synchronization is activated between a mode of the master device and a mode of the identified at least one slave device, and wherein the first information further comprises a device list comprising information related to at least one slave device.

15. The master device of claim 7, wherein the mode activated in the master device is at least one of a Wi-Fi mode, an airplane mode, a sleep mode, a manner mode that indicates one of a ringer mode and a silent mode, and a roaming mode.

16. The master device of claim 7, wherein the transmitting unit is further configured to transmit second information related to a rule applied per mode of the master device and the at least one slave device, and wherein the first information further comprises a device list comprising information related to the at least one slave device.

17. The method of claim 8, wherein the mode activated in the master device is at least one of a Wi-Fi mode, an airplane mode, a sleep mode, a manner mode that indicates one of a ringer mode and a silent mode, and a roaming mode.

18. The method of claim 8, further comprising:

receiving second information related to a rule applied per mode of the master device and the at least one slave device.

19. The slave device of claim 9, wherein the mode activated in the master device is at least one of a Wi-Fi mode, an airplane mode, a sleep mode, a manner mode that indicates one of a ringer mode and a silent mode, and a roaming mode.

20. The slave device of claim 9, wherein the receiving unit is further configured to receive second information related to a rule applied per mode of the master device and the at least one slave device.

* * * * *